United States Patent
Faccin et al.

(10) Patent No.: US 11,539,427 B2
(45) Date of Patent: Dec. 27, 2022

(54) DELAY MANAGEMENT IN WIRELESS NETWORKS

(71) Applicant: QUALCOMM Incorporated, San Diego, CA (US)

(72) Inventors: Stefano Faccin, San Ysidro, CA (US); Mahmoud Watfa, St-Leonard (CA)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/039,718

(22) Filed: Sep. 30, 2020

(65) Prior Publication Data
US 2021/0105064 A1   Apr. 8, 2021

Related U.S. Application Data

(60) Provisional application No. 62/910,270, filed on Oct. 3, 2019.

(51) Int. Cl.
*H04B 7/185*   (2006.01)
*H04W 48/16*   (2009.01)
(Continued)

(52) U.S. Cl.
CPC ....... *H04B 7/1855* (2013.01); *H04B 7/18541* (2013.01); *H04W 8/08* (2013.01);
(Continued)

(58) Field of Classification Search
CPC ............. H04W 84/06; H04W 56/0045; H04W 56/00; H04W 48/12; H04W 84/042; H04W 72/042; H04W 36/14; H04W 56/001; H04W 24/02; H04W 56/0005; H04W 72/04; H04W 60/00; H04W 76/10;
(Continued)

(56) References Cited

U.S. PATENT DOCUMENTS

| | | | | |
|---|---|---|---|---|
| 8,712,411 B1* | 4/2014 | Puliatti | ............ | H04W 4/00 455/434 |
| 2011/0195714 A1* | 8/2011 | Sawinathan | ........ | H04W 60/005 455/435.1 |
| 2020/0313795 A1* | 10/2020 | Xu | ............ | H04B 7/0632 |
| 2020/0396000 A1* | 12/2020 | Ryu | ............ | H04W 24/02 |
| 2021/0144612 A1* | 5/2021 | Wei | ............ | H04W 36/08 |
| 2021/0195491 A1 | 6/2021 | Zhang et al. | | |
| 2022/0100731 A1 | 3/2022 | Tirapu Azpiroz et al. | | |

OTHER PUBLICATIONS

International Search Report and Written Opinion—PCT/US2020/053817—ISA/EPO—dated Jan. 25, 2021.
(Continued)

*Primary Examiner* — Daniel Lai
(74) *Attorney, Agent, or Firm* — Loza & Loza, LLP/Qualcomm Incorporated

(57) ABSTRACT

Aspects relate to delay management techniques to handle delays introduced by high latency links in non-terrestrial networks for non-access stratum (NAS) mobility management and session management procedures. The NAS timers within the user equipment (UE) and core network utilized for mobility management and session management procedures may be configured with different durations, such as a normal duration, an extended duration, or a reduced duration, based on whether the UE is connected to a terrestrial or non-terrestrial radio access network (RAN), one or more capabilities of the UE, and/or the various RAN types (e.g., terrestrial or non-terrestrial) within a registration area that the UE is located in.

47 Claims, 15 Drawing Sheets

(51) Int. Cl.
*H04W 36/32* (2009.01)
*H04W 60/00* (2009.01)
*H04W 8/08* (2009.01)

(52) U.S. Cl.
CPC .......... *H04W 36/32* (2013.01); *H04W 48/16* (2013.01); *H04W 60/00* (2013.01)

(58) Field of Classification Search
CPC ............... H04W 4/02; H04W 88/16; H04W 74/0891; H04W 74/00; H04W 4/021; H04W 76/00; H04W 36/0094; H04W 8/08; H04W 36/32; H04W 48/16; H04W 8/24; H04W 24/08; H04W 76/28; H04W 76/38; H04B 7/18513; H04B 7/1851; H04B 7/18519; H04B 7/0628; H04B 7/2125; H04B 7/1855; H04B 7/18541
See application file for complete search history.

(56) References Cited

OTHER PUBLICATIONS

Nomor Research GMBH, et al., "Considerations on MAC Timers and on RTD Compensation Offset in Non-Terrestrial Networks (NTN)," 3GPP Draft, R2-1818511_MAC_Analysis, 3rd Generation Partnership Project (3GPP), Mobile Competence Centre, 650, Route Des Lucioies, F-06921, Sophia-Antipolis Cedex, France, vol. RAN WG2, No. Spokane, USA; Nov. 12, 2018-Nov. 16, 2018, Nov. 12, 2018 (Nov. 12, 2018), XP051557996, 5 pages, Retrieved from the Internet: URL: http://www.3gpp.org/ftp/Meetings%5F3GPP%5FSYNC/RAN2/Docs/R2%2D1818511%2Ezip [retrieved on Nov. 12, 2018] Title, introduction Sections 1, 2, 2.1, 2.2, 31st. par., 4.

* cited by examiner

DELAY MANAGEMENT IN WIRELESS NETWORKS

CROSS-REFERENCE TO RELATED APPLICATIONS

The present Application for Patent claims priority to and the benefit of U.S. Provisional Application No. 62/910,270, titled "DELAY MANAGEMENT IN WIRELESS NEW-TORKS" filed Oct. 3, 2019, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to managing delays in terrestrial and non-terrestrial networks.

INTRODUCTION

Next-generation wireless communication systems (e.g., 5GS) may include a 5G core network and a 5G radio access network (RAN), such as a New Radio (NR)-RAN. The NR-RAN may be a terrestrial RAN or a non-terrestrial RAN. Non-terrestrial RANs may include airborne or spaceborne vehicles, such as satellites, to support connections between a user equipment (UE) and the core network. For example, non-terrestrial RANs can support connections over trains, boats, and planes and in rural, remote, unserved and/or underserved areas. In some examples, one or more satellites may provide backhaul services between a terrestrial RAN and the core network. In other examples, a satellite may incorporate the functionality of a base station to directly serve a satellite coverage area.

In the control plane, the Non Access Stratum (NAS) is terminated at an access management function (AMF) or a session management function (SMF) in the core network and performs various functions related to mobility management and session management for user equipment (UEs). For example, the NAS may implement registration, service request, protocol data unit (PDU) session establishment, PDU session modification, and PDU session release procedures between the AMF and a UE or between the SMF and the UE. Each of the mobility management and session management procedures may utilize respective timers in the UE and core network to manage delays in message reception and control initiation of message recovery efforts.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for managing delays by a wireless communication device is disclosed. The method can include attaching to a first base station in a first radio access network within a registration area. The first radio access network can have a network type. The network type can be a terrestrial network type or a non-terrestrial network type. The method can further include selecting a respective duration of each timer of a set of one or more timers for communication with a core network via the first base station based on at least one of the network type or a timer selection instruction received from the core network. The method can further include performing at least one of a mobility management procedure or a session management procedure with the core network using the set of one or more timers.

Another example provides a wireless communication device in a wireless communication network. The wireless communication device can include a transceiver, a memory, and a processor communicatively coupled to the transceiver and the memory. The processor and the memory can be configured to attach to a first base station in a first radio access network within a registration area. The first radio access network can have a network type. The network type can be a terrestrial network type or a non-terrestrial network type. The processor and the memory can further be configured to select a respective duration of each timer of a set of one or more timers for communication with a core network via the first base station based on at least one of the network type or a timer selection instruction received from the core network. The processor and the memory can further be configured to perform at least one of a mobility management procedure or a session management procedure with the core network using the set of one or more timers.

In another example, a method for managing delays by a core network serving node in a core network is disclosed. The method can include receiving a registration request from a wireless communication device via a first base station in a first radio access network within a registration area served by the core network serving node. The first radio access network can have a network type. The network type can be a terrestrial network type or a non-terrestrial network type. The method can further include selecting a respective duration of each timer of a set of one or more timers for communication with the wireless communication device via the first base station based on at least one of the network type of the first radio access network or network information associated with the registration area. The method can further include performing one or more mobility management procedures with the wireless communication device using the set of one or more timers.

Another example provides a core network serving node in a core network. The core network serving node can include a network interface, a memory, and a processor communicatively coupled to the network interface and the memory. The processor and the memory can be configured to receive a registration request from a wireless communication device via a first base station in a first radio access network within a registration area served by the core network serving node. The first radio access network can have a network type. The network type can be a terrestrial network type or a non-terrestrial network type. The processor and the memory can further be configured to select a respective duration of each timer of a set of one or more timers for communication with the wireless communication device via the first base station based on at least one of the network type of the first radio access network or network information associated with the registration area. The processor and the memory can further be configured to perform one or more mobility management procedures with the wireless communication device using the set of one or more timers.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
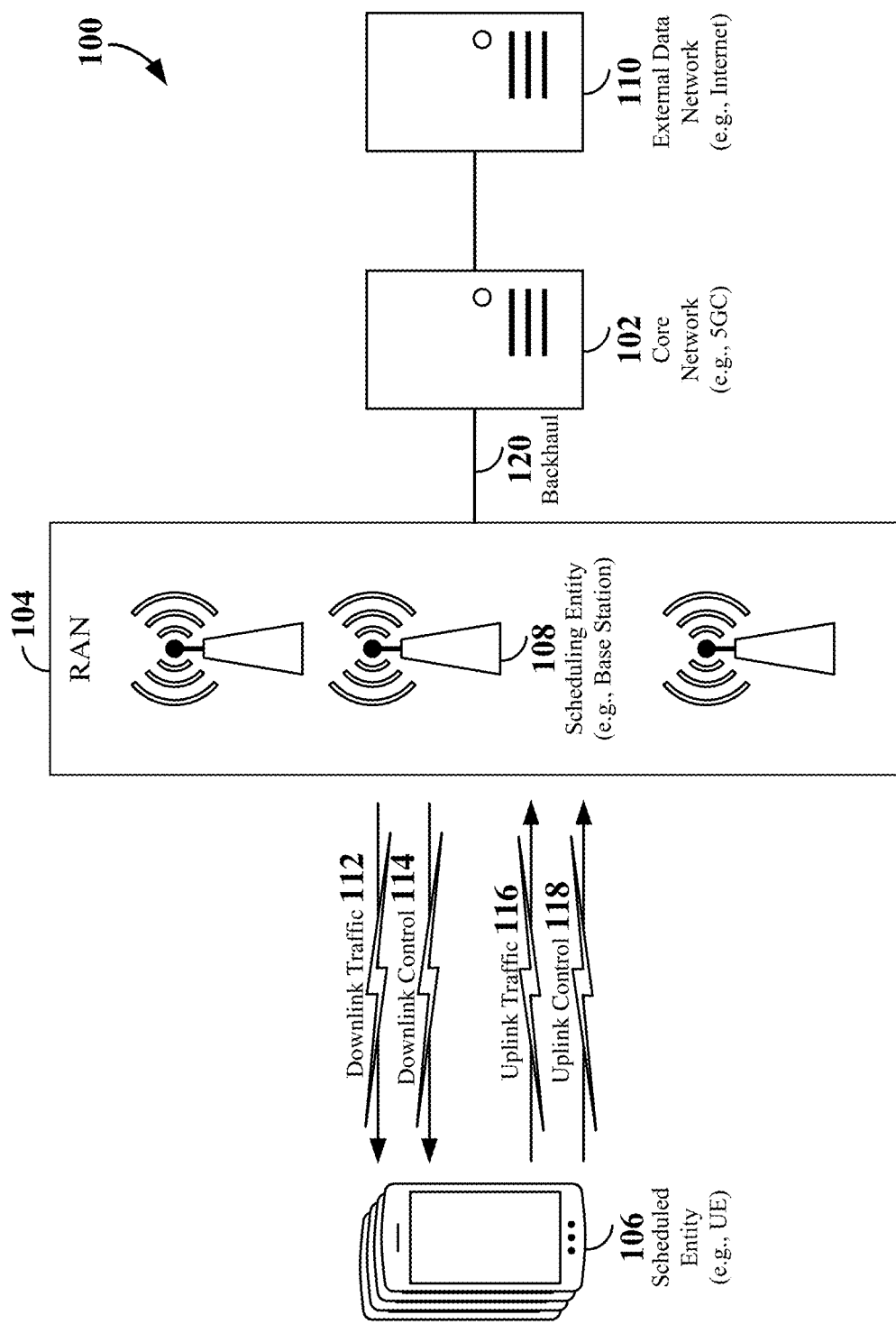
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure provide delay management techniques to handle delays introduced by high latency links in non-terrestrial networks for NAS mobility management and session management procedures. The NAS timers within the UE and core network utilized for mobility management and session management procedures may be configured with different durations (e.g., either a normal duration, an extended duration, reduced duration, etc.). A NAS timer duration may be selected, for example, based on one or more aspects such as the type of RAN (e.g., terrestrial or non-terrestrial) to which a UE is connected, one or more UE capabilities, and/or RAN types within a registration area that the UE is located in. As used herein, the term registration area refers to a set of tracking areas, specifically grouped for a UE based on the UEs mobility pattern. The registration area for a UE may be configured during a registration procedure of the UE with a core network (e.g., in response to a registration request transmitted to the core network upon powering on or entering a new registration area). The registration area for a UE may correspond, for example, to a paging area within which a UE may be paged in idle mode.

In some examples, the UE and AMF within the core network may each select a respective duration (e.g., normal, extended, or reduced) for a set of one or more timers (e.g., NAS timers) based on the type of RAN (or RAT) of the base station to which the UE is attached. In other examples, the AMF may select the duration of the NAS timers based on the RAT/RAN types within the registration area. For example, the AMF may select a normal duration for the set of one or more timers when the AMF selects a registration area including a homogeneous set of terrestrial RANs (e.g., all terrestrial) and an extended duration for the set of one or more timers when the registration area includes at least one non-terrestrial RAN. The AMF may further consider the UE capabilities in selecting the timer durations. For example, the AMF may select an extended duration for the set of one or more timers when the UE capabilities indicate that the UE may support only non-terrestrial RANs and either normal or extended duration for the set of one or more timers when the UE capabilities indicate that the UE may support either terrestrial or non-terrestrial RANs. In some examples, the UE capabilities may be transmitted from the UE to the AMF during a mobility management registration procedure.

The AMF may further transmit a timer selection instruction to the UE instructing the UE to select either the normal or extended duration for the set of one or more timers. Additionally, the AMF may select specific values of the extended duration for the set of one or more timers and deliver the values to the UE. In this example, the UE may initially select the timer durations based on the type of RAN to which the UE is connected. The UE may then switch the timer durations upon receiving the timer selection instruction. In other examples, the UE may select default timer durations (e.g., extended timer durations) until receiving the timer selection instruction from the AMF indicating the timer durations to utilize for mobility and session management procedures.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet or an Ethernet network.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
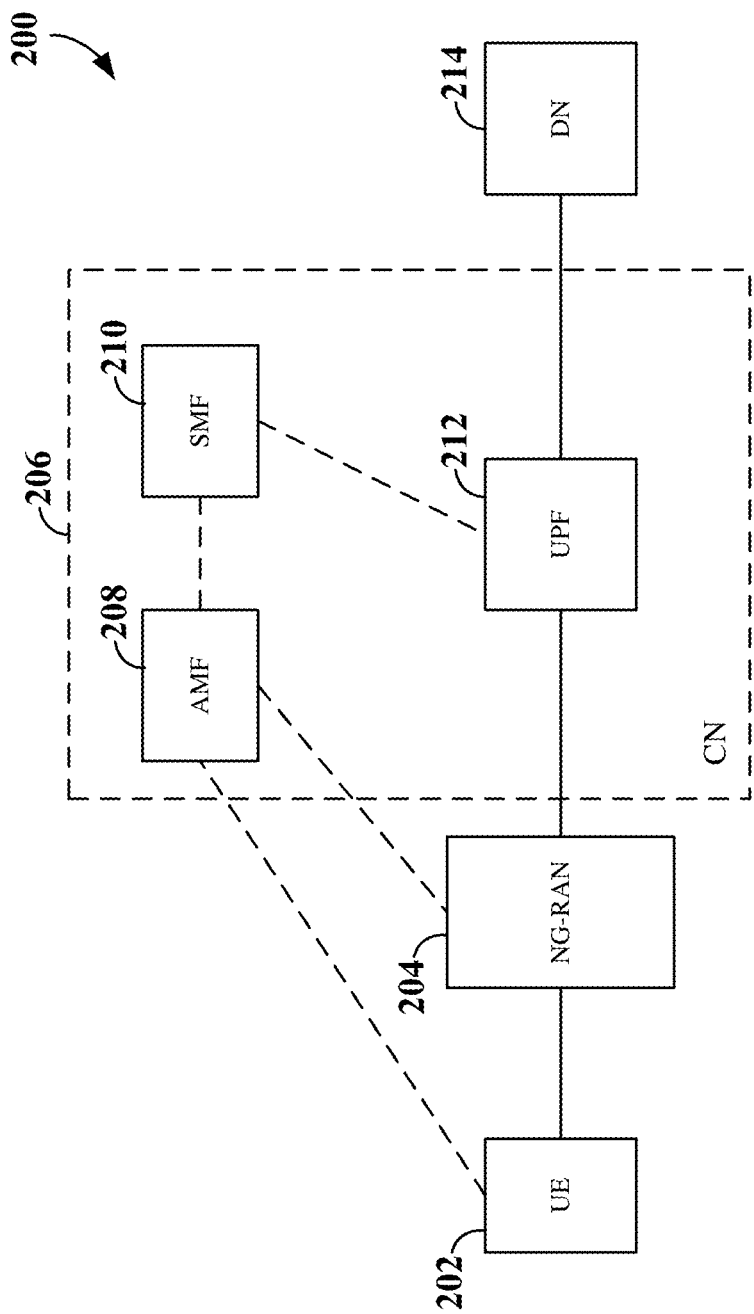
FIG. 2 is a block diagram illustrating an example of a wireless communication system.

Referring now to FIG. 2, by way of example and without limitation, a block diagram illustrating an example of various components of a wireless communication system 200 is provided. In some examples, the wireless communication system 200 may be the same wireless communication system 100 described above and illustrated in FIG. 1. The wireless communication system 200 includes a user equipment (UE) 202, a NR-RAN 204, and a core network 206. By virtue of the wireless communication system 200, the UE 202 may be enabled to carry out data communication with an external data network 214, such as (but not limited to) the Internet or an Ethernet network.

The core network 206 may include, for example, an access management function (AMF) 208, a session management function (SMF) 210, and a user plane function (UPF) 212. The core network 206 may further include other functions, such as a policy control function (PCF), authentication server function (AUSF), and other functions (not illustrated, for simplicity). The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external DN 214). The UPF 212 provides user plane connectivity to route 5G (NR) packets to/from the UE 202 via the NR-RAN 204.

To establish a connection to the 5G core network 206 via the NR-RAN 204, the UE 202 may transmit a registration request and PDU session establishment request to the 5G core network 206 via the NR-RAN 204. The AMF 208 and SMF 210 may process the registration request and PDU session establishment request and establish a data network session (DNS) between the UE 202 and the external DN 214 via the UPF 212. A DNS may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
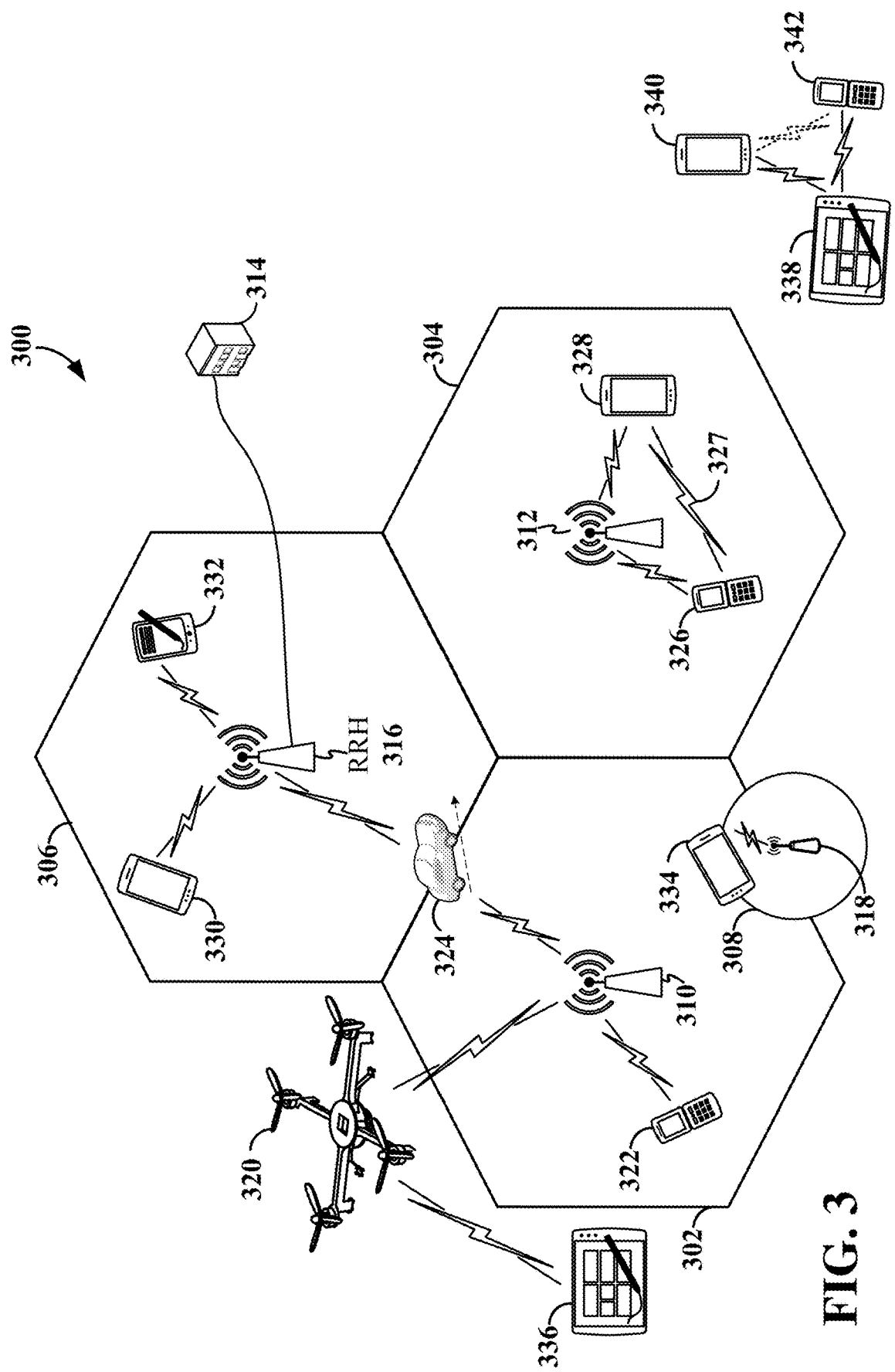
FIG. 3 is a conceptual illustration of an example of a radio access network.

Referring now to FIG. 3, by way of example and without limitation, a schematic illustration of a RAN 300 is provided. In some examples, the RAN 300 may be the same as the RAN 104 described above and illustrated in FIG. 1 and/or the NR-RAN 204 described above and illustrated in FIG. 2. The geographic area covered by the RAN 300 may be divided into cellular regions (cells) that can be uniquely identified by a user equipment (UE) based on an identification broadcasted from one access point or base station. FIG. 3 illustrates macrocells 302, 304, and 306, and a small cell 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 3, two base stations 310 and 312 are shown in cells 302 and 304; and a third base station 314 is shown controlling a remote radio head (RRH) 316 in cell 306. That is, a base station can have an integrated antenna or can be connected to an antenna or RRH by feeder cables. In the illustrated example, the cells 302, 304, and 306 may be referred to as macrocells, as the base stations 310, 312, and 314 support cells having a large size. Further, a base station 318 is shown in the small cell 308 (e.g., a microcell, picocell, femtocell, home base station, home Node B, home eNode B, etc.) which may overlap with one or more macrocells. In this example, the cell 308 may be referred to as a small cell, as the base station 318 supports a cell having a relatively small size. Cell sizing can be done according to system design as well as component constraints.

It is to be understood that the radio access network 300 may include any number of wireless base stations and cells.

Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 108 described above and illustrated in FIG. 1.

Within the RAN 300, the cells may include UEs that may be in communication with one or more sectors of each cell. Further, each base station 310, 312, 314, and 318 may be configured to provide an access point to a core network (e.g., as illustrated in FIGS. 1 and/or 2) for all the UEs in the respective cells. For example, UEs 322 and 324 may be in communication with base station 310; UEs 326 and 328 may be in communication with base station 312; UEs 330 and 332 may be in communication with base station 314 by way of RRH 316; and UE 334 may be in communication with base station 318. In some examples, the UEs 322, 324, 326, 328, 330, 332, 334, 338, 340, and/or 342 may be the same as the UE/scheduled entity 106 described above and illustrated in FIG. 1 and/or the UE 202 described above and illustrated in FIG. 2.

In some examples, an unmanned aerial vehicle (UAV) 320, which may be a drone or quadcopter, can be a mobile network node and may be configured to function as a UE. For example, the UAV 320 may operate within cell 302 by communicating with base station 310.

In a further aspect of the RAN 300, sidelink signals may be used between UEs without necessarily relying on scheduling or control information from a base station. For example, two or more UEs (e.g., UEs 326 and 328) may communicate with each other using peer to peer (P2P) or sidelink signals 327 without relaying that communication through a base station (e.g., base station 312). In a further example, UE 338 is illustrated communicating with UEs 340 and 342. Here, the UE 338 may function as a scheduling entity or a primary sidelink device, and UEs 340 and 342 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 340 and 342 may optionally communicate directly with one another in addition to communicating with the scheduling entity 338. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 327 include sidelink traffic and sidelink control.

In the radio access network 300, the ability for a UE to communicate while moving, independent of its location, is referred to as mobility. The various physical channels between the UE and the radio access network are generally set up, maintained, and released under the control of an access and mobility management function (AMF) 208, illustrated in FIG. 2.

A radio access network 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/316 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/316) within the radio access network 300. Each of the cells may measure a strength of the pilot signal, and the radio access network (e.g., one or more of the base stations 310 and 314/316 and/or a central node within the core network) may determine a serving cell for the UE 324. As the UE 324 moves through the radio access network 300, the network may continue to monitor the uplink pilot signal transmitted by the UE 324. When the signal strength or quality of the pilot signal measured by a neighboring cell exceeds that of the signal strength or quality measured by the serving cell, the network 300 may handover the UE 324 from the serving cell to the neighboring cell, with or without informing the UE 324.

Although the synchronization signal transmitted by the base stations 310, 312, and 314/316 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 300 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 300 may utilize one or more multiplexing and multiple access algorithms to enable simultaneous communication of the various devices. For example, 5G NR specifications provide multiple access for UL transmissions from UEs 322 and 324 to base station 310, and for multiplexing for DL transmissions from base station 310 to one or more UEs 322 and 324, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 310 to UEs 322 and 324 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 300 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 4:
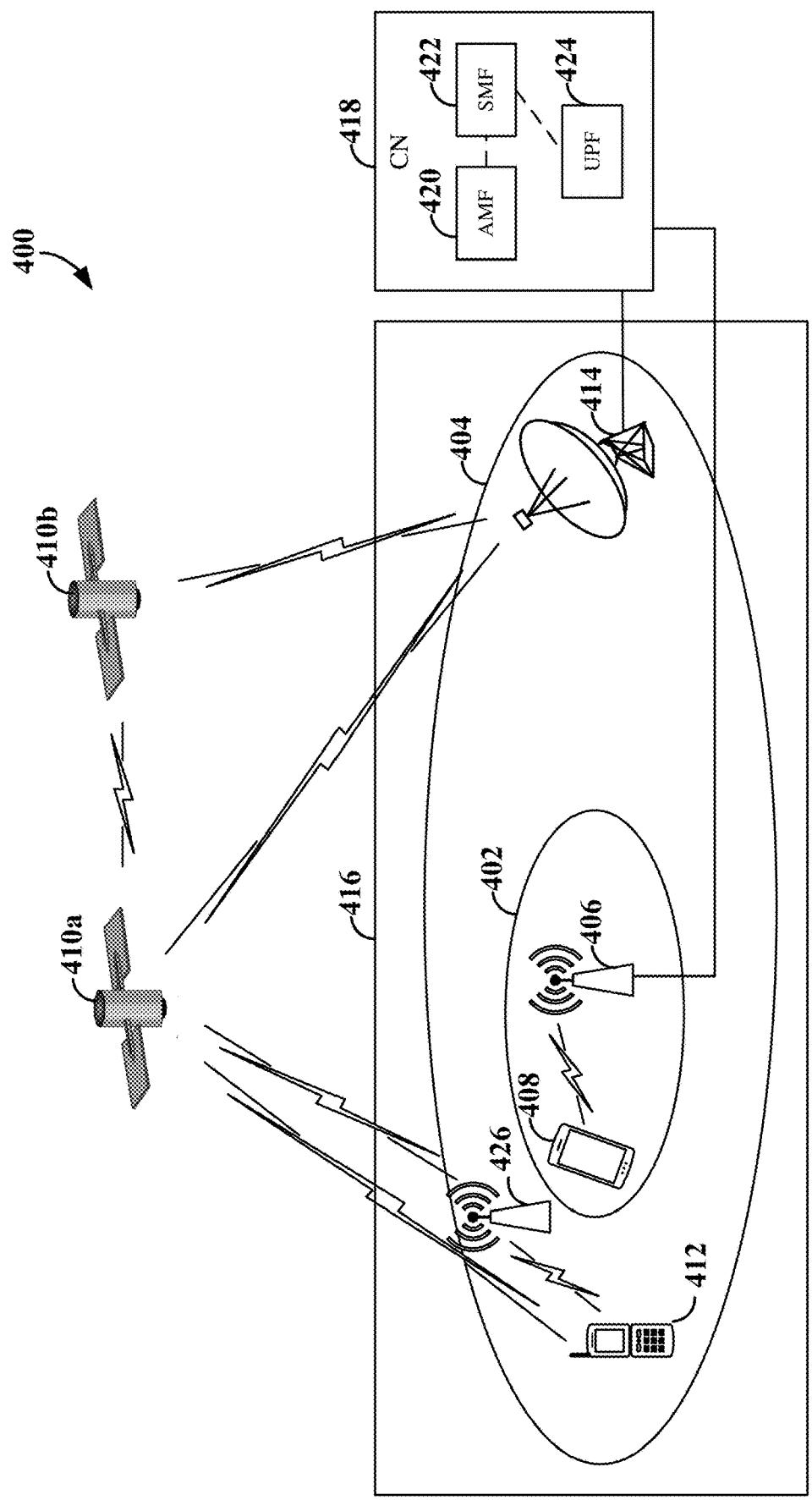
FIG. 4 is a conceptual illustration of an example of a wireless communication system including terrestrial and non-terrestrial radio access networks (RANs).

FIG. 4 illustrates an example of a wireless communication system 400 including a terrestrial RAN 402 and a non-terrestrial RAN 404. The wireless communication system 400 may be a 5G wireless communication system (5GS), which may correspond to, for example, the wireless communication system 100 illustrated in FIG. 1 and/or the wireless communication system 200 illustrated in FIG. 2. Each of the terrestrial RAN 402 and the non-terrestrial RAN 404 may be associated with a respective geographical area. Thus, each of the terrestrial RAN 402 and the non-terrestrial RAN 404 may provide 5G services within the corresponding respective geographical area. The terrestrial RAN 402 may correspond, for example, to the RAN 300 illustrated in FIG. 3. For example, the terrestrial RAN 402 may include one or more base stations 406 (one of which is shown for convenience), each serving one or more UEs 408. The terrestrial RAN 402 may further be coupled to a core network (CN) 418 for communication of user plane and control plane signaling and data.

In some examples, the non-terrestrial RAN 404 may include a satellite 410a operating as a base station (e.g., gNB) to serve one or more UEs 412 within a satellite coverage area. In some examples, the satellite coverage area may include one or more fixed tracking areas (TAs), each including one or more cells (not shown) served by the satellite 410a. Each cell may be defined with respect to a fixed or moving satellite beam spot, depending on the type of satellite. For example, the satellite 410a may be a low earth orbit (LEO) satellite, a medium earth orbit (MEO) satellite, or a geostationary earth orbit (GEO) satellite. LEO satellites may orbit the Earth with an altitude between 300 kilometers (km) and 2,000 km and produce a beam footprint size between 100 km and 500 km. MEO satellites may orbit the Earth with an altitude between 8,000 km and 25,000 km and produce a beam footprint size between 100 km and 500 km GEO satellites may orbit the Earth with an altitude of 35,786 km and produce a beam footprint size between 200 and 1,000 km.

In other examples, the non-terrestrial RAN 404 may include one or more terrestrial base stations 426, one of which is shown for convenience, and the satellite 410a may provide a backhaul link to the core network 418. In this example, the non-terrestrial network 404 includes both terrestrial and non-terrestrial RAN components. The non-terrestrial RAN 404 further includes a satellite gateway (or Earth station) 414 to relay control plane and user plane communication between the satellite 410a and the CN 418. In some examples, the satellite 410a may route communication to/from the satellite gateway 414 through one or more additional satellites 410b via inter-satellite links (ISLs).

In the example shown in FIG. 4, the terrestrial RAN 402 and non-terrestrial RAN 404 are included within the same registration area 416 (e.g., NAS registration area). The registration area 416 may include a number of TAs within which a UE 408 or 412 may roam without performing an updated location registration. For example, as shown in FIG. 4, the registration area 416 may be the same for both UE 408 and UE 412. In other examples, the respective registration areas for UEs 408 and 412 may be different based on the different mobility patterns of the UEs 408 and 412. In some examples, a single registration area 416 of a UE (e.g., UE 408) may include each of the terrestrial and non-terrestrial RANs 402 and 404 (as shown in FIG. 4). In other examples, the terrestrial RAN 402 and non-terrestrial RAN 404 may be included in separate registration areas of the UE 408. In some examples, one or both of the terrestrial and non-terrestrial RANs 402 and 404 may include two or more registration areas of the UE 408.

The CN 418 may include an AMF 420, SMF 422, and UPF 424, as described above in connection with FIG. 2. The UPF 424 may be configured to provide user plane connectivity to route PDUs (or packets) to/from the UEs 408 and 412 via the RANs 402 and 404. The AMF 420 and SMF 422 may be configured to provide control plane connectivity to perform NAS signaling with each of the UEs 408 and 412 via the RANs 402 and 404. For example, the AMF 420 may perform various mobility management procedures, such as registration and service request procedures, with the UEs 408 and 412, while the SMF 422 may perform various session management procedures, such as PDU session establishment, PDU session modification, and PDU session release procedures, with the UEs 408 and 412 via the AMF 420.

Each of the mobility management and session management procedures may utilize respective timers in the UE and the AMF/SMF 420/422 to manage delays in message reception and control initiation of message recovery efforts. For example, each timer may be configured to establish a respective maximum duration of time for performing one of the mobility management procedures or the session management procedures. Therefore, the timers may be initiated with a respective duration of time taking into account an expected round trip time (RTT) of messages exchanged between the CN 418 and the UEs 408 and 412 during the procedure. Here, the expected RTT is associated with the exchange of messages via a terrestrial RAN (e.g., RAN 402).

However, when messages are exchanged between the UE 412 and the CN 418 via the non-terrestrial RAN 404, each satellite leg on which a message is sent can introduce an additional propagation delay. For example, propagation delays may be experienced on the ground-to-satellite leg from the UE 412 to the satellite 410a, on the satellite-to-satellite leg (e.g., inter-satellite link) from the satellite 410a to satellite 410b, and on the satellite-to-ground leg from the satellite 410b to the satellite gateway 414. Depending on the type of satellite 410a, the propagation delay between the UE 412 and the satellite 410a may vary significantly (i.e., between 2 ms and 140 ms). In addition, the propagation delay between the satellite 410a or 410b and the CN 418 may also vary significantly (i.e., between 2 ms and 140 ms).

In accordance with various aspects of the disclosure, to accommodate for the maximum possible propagation delay, each set of two messages exchanged between the UE 412 and the CN 418 via the non-terrestrial RAN 404 may be considered to incur 1.5 times the expected RTT delay. For example, the mobility management registration procedure involves up to five round trip communications over satellite links (e.g., one message for the UE to transmit a registration request to the AMF 420, two messages to transmit an optional identity request/response between the AMF 420 and UE 412, two messages to transmit an optional authentication request/response between the AMF 420 and UE 412, two messages to transmit an optional security mode request/response between the AMF 420 and UE 412, two messages for an optional second identity request/response between the AMF 420 and UE 412, and one message for the AMF 420 to transmit a registration accept to the UE 412). The registration procedure enables the UE 412 to register with the network, get authorized to receive services, and enable mobility tracking for reachability. To account for the additional RTT delay over satellite links, the respective registration procedure timers implemented in the AMF 420 and UE 412 may each be configured to support a delay of 7.5 times the expected RTT delay.

As another example, the mobility management service request procedure involves up to three round trip communications over satellite links (e.g., one message for the UE to transmit a service request to the AMF 420, two messages to transmit an optional authentication request/response between the AMF 420 and UE 412, two messages to transmit an optional security mode request/response between the AMF 420 and UE 412, and one message for the AMF 420 to transmit a registration accept to the UE 412). The service request procedure may be used by the UE 412 to request the establishment of a secure connection to the AMF 420. The service request may also be used by the UE 412 to activate a user plane connection for an established PDU session. To account for the additional RTT delay over satellite links, the respective service request procedure timers implemented in the AMF 420 and UE 412 may each be configured to support a delay of 4.5 times the expected RTT delay.

As yet another example, the session mode PDU session establishment procedure involves up to four round trip communications over satellite links (e.g., one message for the UE to transmit a PDU session establishment request to the AMF 420, up to six messages to transmit a PDU session authentication request/response between the SMF 422 and UE 412, and one message for the AMF 420 to transmit a PDU session establishment accept to the UE 412). Therefore, the respective PDU session establishment procedure timers implemented in the SMF 422 and UE 412 may each be configured to support a delay of 6 times the expected RTT delay.

As yet another example, the session mode PDU session modification procedure involves one round trip communication over satellite links (e.g., one message for the UE to transmit a PDU session modification request to the AMF 420 and one message for the SMF 422 to transmit a PDU session modification accept to the UE 412). Therefore, the respective PDU session modification procedure timers implemented in the SMF 422 and UE 412 may each be configured to support a delay of 1.5 times the expected RTT delay.

As yet another example, the session mode PDU session release procedure involves one round trip communication over satellite links (e.g., one message for the UE to transmit a PDU session release request to the AMF 420 and one message for the SMF 422 to transmit a PDU session release command to the UE 412). Therefore, the respective PDU session release procedure timers implemented in the SMF 422 and UE 412 may each be configured to support a delay of 1.5 times the expected RTT delay.

In some examples, the mobility management and session management timers implemented at the UEs 408 and 412 and CN 418 may be modified (increased) to support the respective additional RTT delays introduced by non-terrestrial RANs 404. Increasing the mobility management and session management timer durations may be beneficial for a UE (e.g., UE 412) that is only capable of connecting via a non-terrestrial RAN 404. However, some UEs 408/412 may be capable of connecting via a terrestrial RAN 402 or a non-terrestrial RAN 404, depending on the UE location and RAN availability, and increasing the respective duration of the timers for such UEs 408/412 regardless of RAN type to which the UE 408/412 is connected may be inefficient.

Therefore, in various aspects of the disclosure, different durations (e.g., normal, extended, reduced, etc.) for a set of one or more timers may be implemented at the UEs 408/412 and CN 418 to support both expected RTT delays of terrestrial networks and increased RTT delays of non-terrestrial networks. A first respective duration for each timer in the set of one or more timers may be a regular duration taking into account the expected RTT delay of terrestrial networks. A second respective duration for each timer in the set of one or more timers may be an extended duration taking into account the increased RTT delay of non-terrestrial networks. Each of the timers in the set of one or more timers may correspond to one of the mobility management or session management procedure timers (e.g., registration procedure timer, service request procedure timer, PDU session establishment procedure timer, PDU session modification timer, and PDU session release timer).

For example, the second duration (e.g., extended duration) for the registration procedure timer may be increased by 7.5 times the expected RTT delay of the first duration (e.g., normal duration). In addition, the second duration (e.g., extended duration) for the service request procedure timer may be increased by 4.5 times the expected RTT delay of the first duration (e.g., normal duration). Similarly, the second duration (e.g., extended duration) for the PDU session establishment timer may be increased by 6 times the expected RTT delay of the first duration (e.g., normal duration), the second duration (e.g., extended duration) for the PDU session modification timer may be increased by 1.5 times the expected RTT delay of the first duration (e.g., normal duration), and second duration (e.g., the extended duration) for the PDU session release timer may be increased by 1.5 times the expected RTT delay of the first duration (e.g., normal duration).

Figure 5:
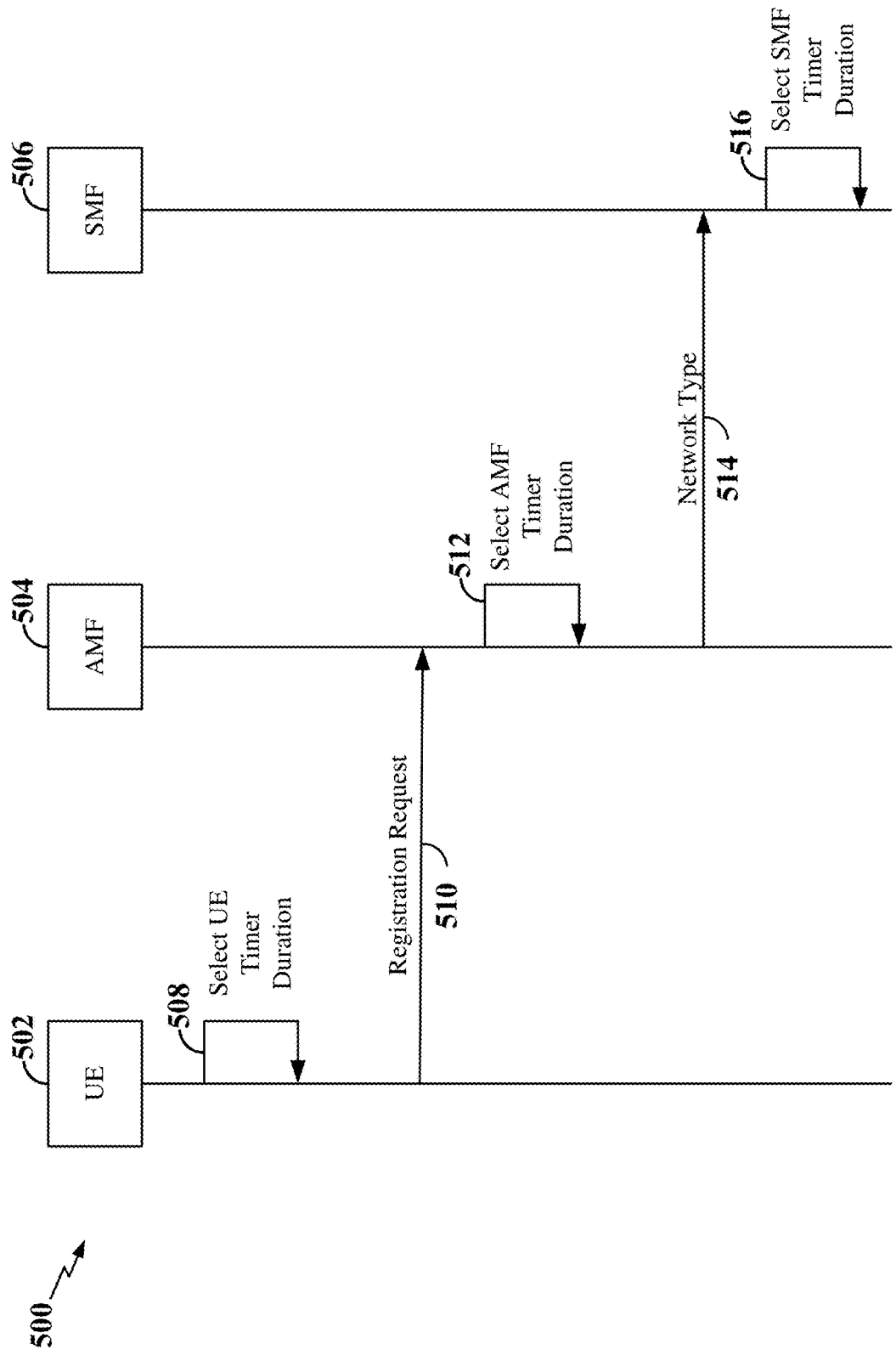
FIG. 5 is a signaling diagram illustrating an example of managing delay in terrestrial and non-terrestrial RANs.

FIG. 5 is a signaling diagram 500 illustrating an example of managing delay in terrestrial and non-terrestrial RANs. In the example shown in FIG. 5, a UE 502 is configured to communicate with an AMF 504 and SMF 506 within a core network via either a terrestrial or non-terrestrial RAN (not shown, for simplicity). The UE 502 may correspond, for example, to any of the UEs illustrated in FIGS. 1-4. The AMF 504 and SMF 506 may correspond to the AMF and SMF illustrated in FIG. 2 or 4.

At 508, the UE 502 may select a UE timer duration for each of the mobility management and session management timers implemented within the UE 502. In some examples, the UE 502 may be configured with different durations (e.g., normal, extended, reduced, etc.) for each of the mobility management and session management timers. For example, the UE 502 may be configured with two respective durations for each of the mobility management and session management timers, one duration corresponding to a regular duration and another duration corresponding to an extended duration. The UE 502 may then select one of the respective durations for each timer. The UE 502 may select the UE timer duration based on the network or RAT type (e.g., terrestrial or non-terrestrial) of the RAN to which the UE attaches (connects). For example, when the UE 502 attaches to a base station (e.g., gNB) within a terrestrial RAN, the UE 502 may select a regular timer duration. In addition, when the UE 502 attaches to a base station (e.g., satellite gNB) within a non-terrestrial RAN, the UE 502 may select an extended timer duration. In some examples, the UE may apply extended duration values previously received for the current public land mobile network (PLMN) during a previous registration in the PLMN with an AMF.

At 510, the UE 502 may transmit a registration request to the AMF 504 within the core network. In some examples, the registration request may include one or more UE capabilities. For example, the UE capabilities may include a network type indication that indicates whether the UE 502 is capable of supporting both the terrestrial network type and the non-terrestrial network type or whether the UE 502 is only capable of supporting the non-terrestrial network type. The UE capabilities (e.g., network type indication) may further indicate a set of one or more satellite types within the non-terrestrial network type supported by the UE 502. For example, the UE capabilities may indicate whether the UE 502 may support communication with LEO, MEO, and/or GEO satellites.

At 512, the AMF 504 may select an AMF timer duration for each of the mobility management timers implemented within the AMF 504. For example, the AMF 504 may be configured with different durations (e.g., normal, extended, reduced, etc.) for each of the mobility management timers. For example, the AMF 504 may be configured with two respective durations for each of the mobility management timers, one duration corresponding to a regular duration and another duration corresponding to an extended duration. In some examples, the AMF 504 may initiate each of the timers with the selected AMF timer duration (e.g., regular or extended). In examples in which the respective durations of the mobility management timers are extended durations, the AMF 504 may dynamically determine the respective extended durations of each timer of the mobility management timers or utilize predefined durations for the mobility management timers.

The AMF 504 may select the AMF timer duration based on the UE capabilities and the RAN type (network type) of the RAN (e.g., base station) to which the UE 502 is attached. In this example, the registration area including the attached-to RAN is a homogenous registration area containing only a single RAN type (e.g., either terrestrial or non-terrestrial).

For example, when the RAN type is a terrestrial RAN, the AMF 504 may select a regular timer duration. In addition, when the RAN type is a non-terrestrial RAN, the AMF 504 may select an extended timer duration. In some examples, the AMF 504 may determine the RAN type based on the gNB ID part of the Global RAN Node ID. In other examples, the AMF 504 may determine the RAN type based on an explicit indication of the RAN type from the UE 502 in the registration request. In still other examples, the AMF 504 may determine the RAN type using any suitable information or tools available to the AMF 504.

At 514, the AMF 504 may transmit the network type to the SMF 506. For example, during the UE requested PDU session establishment procedure, the AMF 504 may send the network type towards the SMF 506 in a Nsmf_PDUSession_CreateSMContext Request.

At 516, the SMF 506 may select an SMF timer duration for each of the session management timers implemented within the SMF 506. In some examples, the SMF 506 may be configured with different durations (e.g., normal, extended, reduced, etc.) for each of the session management timers. For example, the SMF 506 may be configured with two respective durations for each of the session management timers, one duration corresponding to a regular duration and another duration corresponding to an extended duration. The SMF 506 may then select one of the durations (e.g., regular or extended). The SMF 506 may select the SMF timer duration based on the RAN type (network type) of the RAN (e.g., base station) to which the UE 502 is attached.

Figure 6:
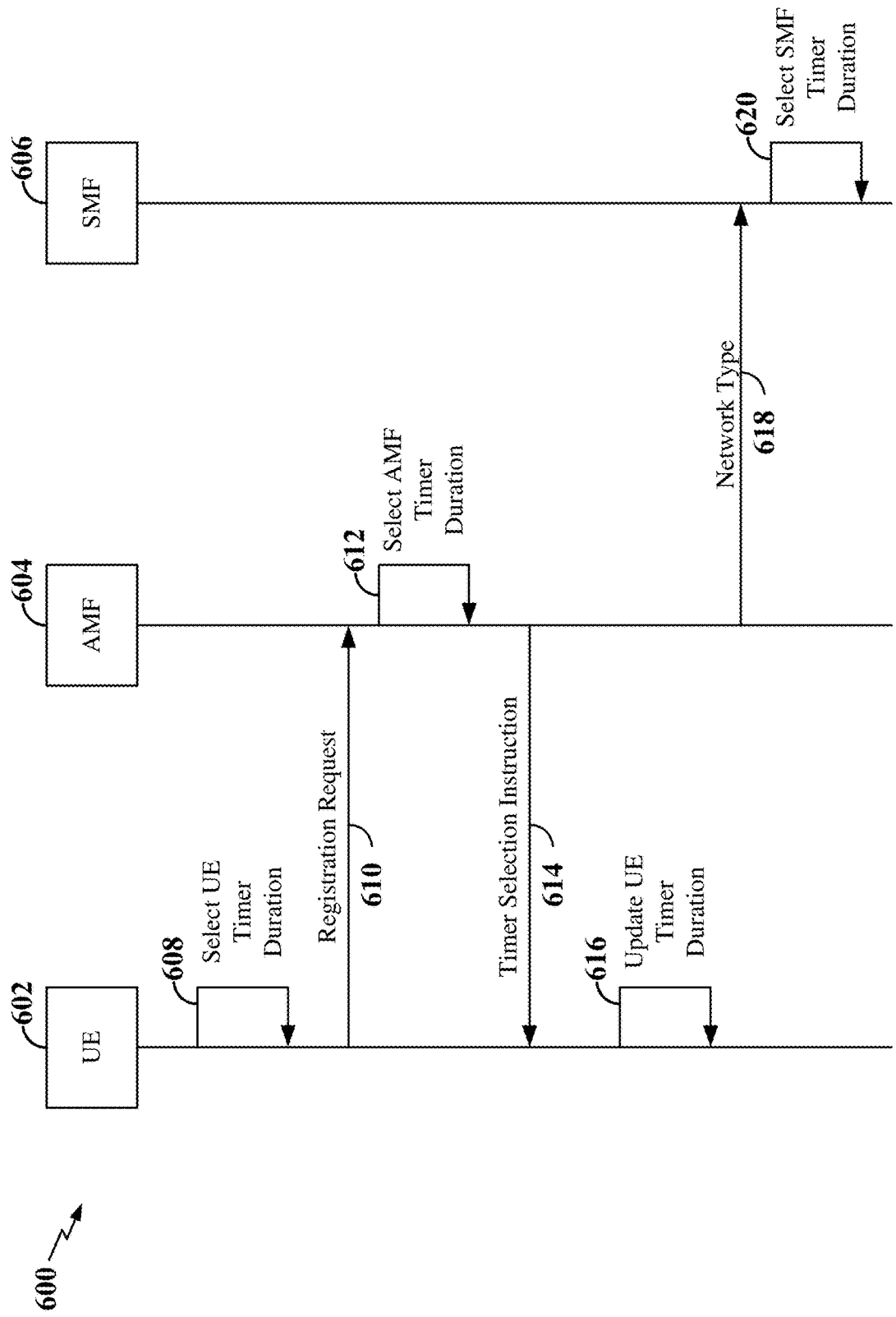
FIG. 6 is a signaling diagram illustrating another example of managing delay in terrestrial and non-terrestrial RANs.

FIG. 6 is a signaling diagram 600 illustrating another example of managing delay in terrestrial and non-terrestrial RANs. In the example shown in FIG. 6, a UE 602 is configured to communicate with an AMF 604 and SMF 606 within a core network via either a terrestrial or non-terrestrial RAN (not shown, for simplicity). The UE 602 may correspond, for example, to any of the UEs illustrated in FIGS. 1-4. The AMF 604 and SMF 606 may correspond to the AMF and SMF illustrated in FIG. 2 or 4.

At 608, the UE 602 may select a UE timer duration for each of the mobility management and session management timers implemented within the UE 602. In some examples, the UE 602 may be configured with different durations (e.g., normal, extended, reduced, etc.) for each of the mobility management and session management timers. For example, the UE 502 may be configured with two respective durations for each of the mobility management and session management timers, one duration corresponding to a regular duration and another duration corresponding to an extended duration. The UE 602 may then select one of the UE timer durations.

In some examples, the UE 602 may select the UE timer duration based on the network type (e.g., terrestrial or non-terrestrial) of the RAN to which the UE attaches (connects). For example, when the UE 602 attaches to a base station (e.g., gNB) within a terrestrial RAN, the UE 602 may select a regular timer duration. In addition, when the UE 602 attaches to a base station (e.g., satellite gNB) within a non-terrestrial RAN, the UE 602 may select an extended timer duration. In some examples, the UE may apply extended duration values previously received for the current public land mobile network (PLMN) during a previous registration in the PLMN with an AMF. In other examples, the UE 602 may select a default UE timer duration irrespective of the network type of the RAN to which the UE attaches. For example, the default UE timer duration may be the extended timer duration.

At 610, the UE 602 may transmit a registration request to the AMF 604 within the core network. In some examples, the registration request may include one or more UE capabilities. For example, the UE capabilities may include a network type indication that indicates whether the UE 602 is capable of supporting both the terrestrial network type and the non-terrestrial network type or whether the UE 602 is only capable of supporting the non-terrestrial network type. The UE capabilities (e.g., network type indication) may further indicate a set of one or more satellite types within the non-terrestrial network type supported by the UE 602. For example, the UE capabilities may indicate whether the UE 602 may support communication with LEO, MEO, and/or GEO satellites.

At 612, the AMF 604 may select an AMF timer duration for each of the mobility management timers implemented within the AMF 604. In some examples, the AMF 604 may be configured with different durations (e.g., normal, extended, reduced, etc.) for each of the mobility management timers. For example, the AMF 604 may be configured with two respective durations for each of the mobility management timers, one duration corresponding to a regular duration and another duration corresponding to an extended duration. In examples in which the respective durations of the mobility management timers are extended durations, the AMF 604 may dynamically determine the respective extended durations of each timer of the mobility management timers or utilize predefined durations for the mobility management timers.

The AMF 604 may select the AMF timer duration based on one or more of the UE capabilities, the RAN type (network type) of the RAN to which the UE 602 is attached, and the RAN types within the registration area containing the attached-to RAN. For example, the registration area may contain only a single RAN type (e.g., either terrestrial or non-terrestrial) or may contain both RAN types (e.g., both terrestrial and non-terrestrial).

For example, if the UE capabilities indicate that the UE 602 can support both the terrestrial RAN type and the non-terrestrial RAN type and the registration area containing the attached-to RAN includes a homogenous set of terrestrial RANs (i.e., is a homogeneous registration area containing only terrestrial RANs), such that the attached-to RAN is a terrestrial RAN, the AMF may select a regular timer duration. As another example, if the UE capabilities indicate that the UE 602 can support only non-terrestrial RAN types, and as such, the attached-to RAN is a non-terrestrial RAN, the AMF 604 may select the regular timer duration.

As yet another example, if the UE capabilities indicate that the UE 602 can support both the terrestrial RAN type and the non-terrestrial RAN type and the registration area containing the attached-to RAN includes at least one non-terrestrial RAN, the AMF may select an extended time duration. In this example, the attached-to RAN may be a terrestrial RAN or a non-terrestrial RAN. In addition, the registration area may include a homogenous set of non-terrestrial RANs or may include both terrestrial and non-terrestrial RANs. In this example, even though the UE 602 may be attached to a terrestrial RAN, the AMF 604 may select the extended timer duration to enable the UE 602 to roam between RANs of different types within the registration area without updating the timer durations. For example, the UE 602 may perform a handover to another base station within a different RAN having a different RAN type (e.g., from terrestrial to non-terrestrial or vice-versa). The AMF 604 may then continue to use the same AMF timer duration for mobility management procedures when the UE is attached to the other RAN.

At 614, the AMF 604 may transmit a timer selection instruction to the UE 602 instructing the UE 602 to utilize either the regular duration or the extended duration for the mobility management and session management timers based on the selected AMF timer duration. In this example, the timer selection instruction may instruct the UE 602 to utilize the same timer durations as selected by the AMF. For example, when the AMF 604 selects the regular timer duration, the timer selection instruction may instruct the UE to utilize the regular timer duration. In some examples, the timer selection instruction may include specific timer values (durations) for each of the mobility management and session management timers.

At 616, the UE 602 may update the UE timer duration based on the timer selection instruction. For example, if the UE 602 initially selected the regular timer duration at 608 as a result of attaching to a terrestrial RAN, and the timer selection instruction instructs the UE to utilize the extended timer duration, the UE 602 may switch from the regular timer duration to the extended timer duration (e.g., by re-initializing the timers with the respective extended durations of time). Similarly, if the UE 602 initially selected the extended timer duration by default at 608, and the timer selection instruction instructs the UE 602 to utilize the regular timer duration, the UE 602 may switch from the extended timer duration to the regular timer duration (e.g., by re-initializing the the timers with the respective regular durations of time). If the timer selection instruction instructs the UE 602 to utilize the same timer duration as initially selected by the UE 602 at 608, the UE 602 does not take any action in response to the timer selection instruction.

At 618, the AMF 604 may transmit the network type to the SMF 606. For example, during the UE requested PDU session establishment procedure, the AMF 604 may send the network type towards the SMF 606 in a Nsmf_PDUSession_CreateSMContext Request.

At 620, the SMF 606 may select an SMF timer duration for each of the session management timers implemented within the SMF 606. In some examples, the SMF 506 may be configured with different durations (e.g., normal, extended, reduced, etc.) for each of the session management timers. For example, the SMF 506 may be configured with two respective durations for each of the session management timers, one duration corresponding to a regular duration and another duration corresponding to an extended duration. The SMF 606 may then select one of the durations (e.g., regular or extended). The SMF 606 may select the SMF timer duration based on the RAN type (network type) of the RAN (e.g., base station) to which the UE 602 is attached regardless of the timer duration selected by the AMF 604 and UE 602.

Figure 7:
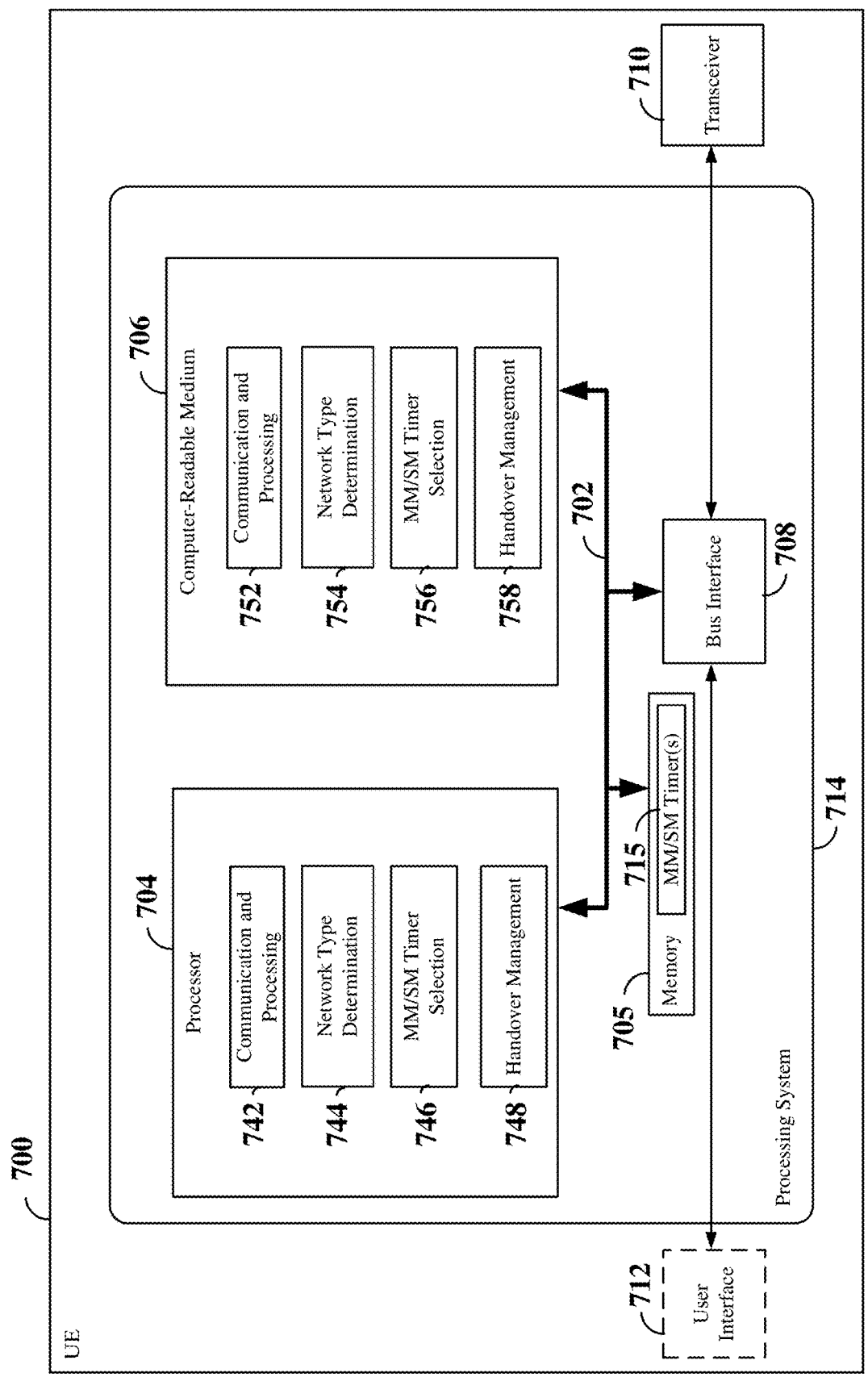
FIG. 7 is a block diagram conceptually illustrating an example of a hardware implementation for a wireless communication device.

FIG. 7 is a block diagram illustrating an example of a hardware implementation for a wireless communication device 700 employing a processing system 714. For example, the wireless communication device 700 may be a user equipment (UE) or other device configured to wirelessly communicate with a base station, as illustrated in any one or more of FIGS. 1-6.

The wireless communication device 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 700 may be configured to perform any one or more of the functions described herein. That is, the processor 704, as utilized in a wireless communication device 700, may be used to implement any one or more of the processes and procedures described below.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a wireless transmission medium. In some examples, the wireless communication device may include two or more transceivers 710, each configured to communicate with a respective network type (e.g., terrestrial or non-terrestrial). Depending upon the nature of the apparatus, a user interface 712 (e.g., keypad, display, speaker, microphone, joystick) may also be provided. Of course, such a user interface 712 is optional, and may be omitted in some examples, such as an IoT device.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include communication and processing circuitry 742. The communication and processing circuitry 742 may include one or more hardware components that provide the physical structure that performs various processes related to wireless communication (e.g., signal reception and/or signal transmission) as described herein. The communication and processing circuitry 742 may further include one or more hardware components that provide the physical structure that performs various processes related to signal processing (e.g., processing a received signal and/or processing a signal for transmission) as described herein. In some examples, the communication and processing circuitry 742 may include two or more transmit/receive chains, each configured to process signals in a different RAT (or RAN) type. For example, the communication and processing circuitry 742 may include a terrestrial transmit/receive chain and a non-terrestrial transmit/receive chain.

In some examples, the communication and processing circuitry 742 may be configured to generate and transmit via the transceiver 710 a registration request including one or more UE capabilities to the AMF in the core network. For example, the UE capabilities may include a network type indication that indicates whether the wireless communication device 700 is capable of supporting both the terrestrial network type and the non-terrestrial network type or whether the wireless communication device 700 is only capable of supporting the non-terrestrial network type. The UE capabilities (e.g., network type indication) may further indicate a set of one or more satellite types within the non-terrestrial network type supported by the wireless communication device 700. For example, the UE capabilities may indicate whether the wireless communication device 700 may support communication with LEO, MEO, and/or GEO satellites.

The communication and processing circuitry 742 may further be configured to receive and process a timer selection instruction from the AMF in the core network. The timer selection instruction may instruct the wireless communication device to utilize either the regular duration or the extended duration for mobility management (MM) and session management (SM) timers 715. In some examples, the timer selection instruction may include specific timer values (durations) for each of the MM/SM timers 715. The MM/SM timers 715 may be maintained, for example, in memory 705. In some examples, the MM/SM timers 715 may be initialized with either the regular duration or the extended duration (or the specific duration indicated by the timer selection instruction).

The communication and processing circuitry 742 may further be configured to perform one or more mobility management and/or session management procedures with the core network using the MM/SM timers 715. In addition, the communication and processing circuitry 742 may be configured to perform an initial attach procedure to attach to a base station (e.g., gNB or satellite gNB) within a RAN (e.g., a terrestrial RAN or non-terrestrial RAN). For example, the communication and processing circuitry 742 may be configured to perform a random access procedure to attach to the base station. The communication and processing circuitry 742 may further be configured to execute communication and processing software 752 included on the computer-readable medium 706 to implement one or more functions described herein.

The processor 704 may also include network type (e.g., RAN type) determination circuitry 744. The network type determination circuitry 744 may be configured to determine the network type (e.g., terrestrial or non-terrestrial) of the RAN to which the wireless communication device is attached. In some examples, the network type determination circuitry 744 may determine the network type based on the transceiver 710 and/or transmit/receive chain in the communication and processing circuitry 742 utilized for communication with the attached-to RAN. The network type determination circuitry 744 may further be configured to execute network type determination software 754 included on the computer-readable medium 706 to implement one or more functions described herein.

The processor 704 may further include MM/SM timer selection circuitry 746. The MM/SM timer selection circuitry 746 may be configured to select a respective duration for each timer of a set of one or more MM/SM timers 715 in the memory 705 for mobility management and session management procedures with the core network. In some examples, the MM/SM timer selection circuitry 746 may be configured to select a respective duration for each timer of the set of one or more MM/SM timers 715 for communication with the core network based on at least one of the network type of the attached-to RAN, as determined by the network type determination circuitry 744, or the timer selection instruction received by the communication and processing circuitry 742 from the core network. For example, the set of MM/SM timers 715 may have a regular duration or an extended duration. In some examples, each timer within the set of MM/SM timers 715 may be initialized with either the respective regular duration or the respective extended duration (or a specific extended duration indicated in the timer selection instruction). Here, the regular duration amounts and extended duration amounts may further be stored in the memory 705.

In some examples, the MM/SM timer selection circuitry 746 may select the respective duration of each timer of the set of one or more MM/SM timers 715 based on the network type. In this example, the set of MM/SM timers 715 may include the regular duration when the network type is the terrestrial network type and the extended duration when the network type is the non-terrestrial network type.

In some examples, the MM/SM timer selection circuitry 746 may select an initial respective duration for each timer of the set of one or more MM/SM timers 715. For example, the initial durations may be selected based on the network type. As another example, the initial durations may correspond to default durations selected irrespective of the network type. In some examples, the default durations may correspond to the extended duration.

The MM/SM timer selection circuitry 746 may further be configured to update the durations of the set of one or more MM/SM timers from the durations to updated durations based on the timer selection instruction. For example, the MM/SM timer selection circuitry 746 may be configured to switch from an initial regular duration for the set of one or more MM/SM timers selected based on the network type to an updated extended duration for the set of one or more MM/SM timers when the timer selection instruction instructs the wireless communication device 700 to utilize the extended timer duration. The timer selection instruction may instruct the wireless communication device 700 to utilize the extended timer duration, for example, when the registration area containing the attached-to RAN includes at least one non-terrestrial RAN. As another example, the MM/SM timer selection circuitry 746 may be configured to switch from an initial extended duration for the set of one or more MM/SM timers selected by default to an updated regular duration for the set of one or more MM/SM timers when the timer selection instruction instructs the wireless communication device 700 to utilize the regular timer duration. The timer selection instruction may instruct the wireless communication device 700 to utilize the regular timer duration, for example, when the registration area containing the attached-to RAN includes a homogenous set of terrestrial networks. The MM/SM timer selection circuitry 746 may further be configured to execute MM/SM timer selection software 756 included on the computer-readable medium 706 to implement one or more functions described herein.

The processor 704 may further include handover management circuitry 748. The handover management circuitry 748 may be configured to perform a handover of the wireless communication device 700 from a first base station in a first RAN to a second base station in a second RAN. In some examples, the first RAN and the second RAN have different network types. For example, the first RAN may be a terrestrial RAN and the second RAN may be a non-terrestrial RAN. The handover management circuitry 748 may further be configured to determine whether the second RAN is within the same registration area as the first RAN. When the second RAN is within the same registration area as the first RAN, the handover management circuitry 748 may further be configured to maintain the same duration for the set of one or more MM/SM timers 715 utilized in the first RAN for communication with the core network via the second RAN. The handover management circuitry 748 may further be configured to execute handover management software 758 included on the computer-readable medium 706 to implement one or more functions described herein.

Figure 8:
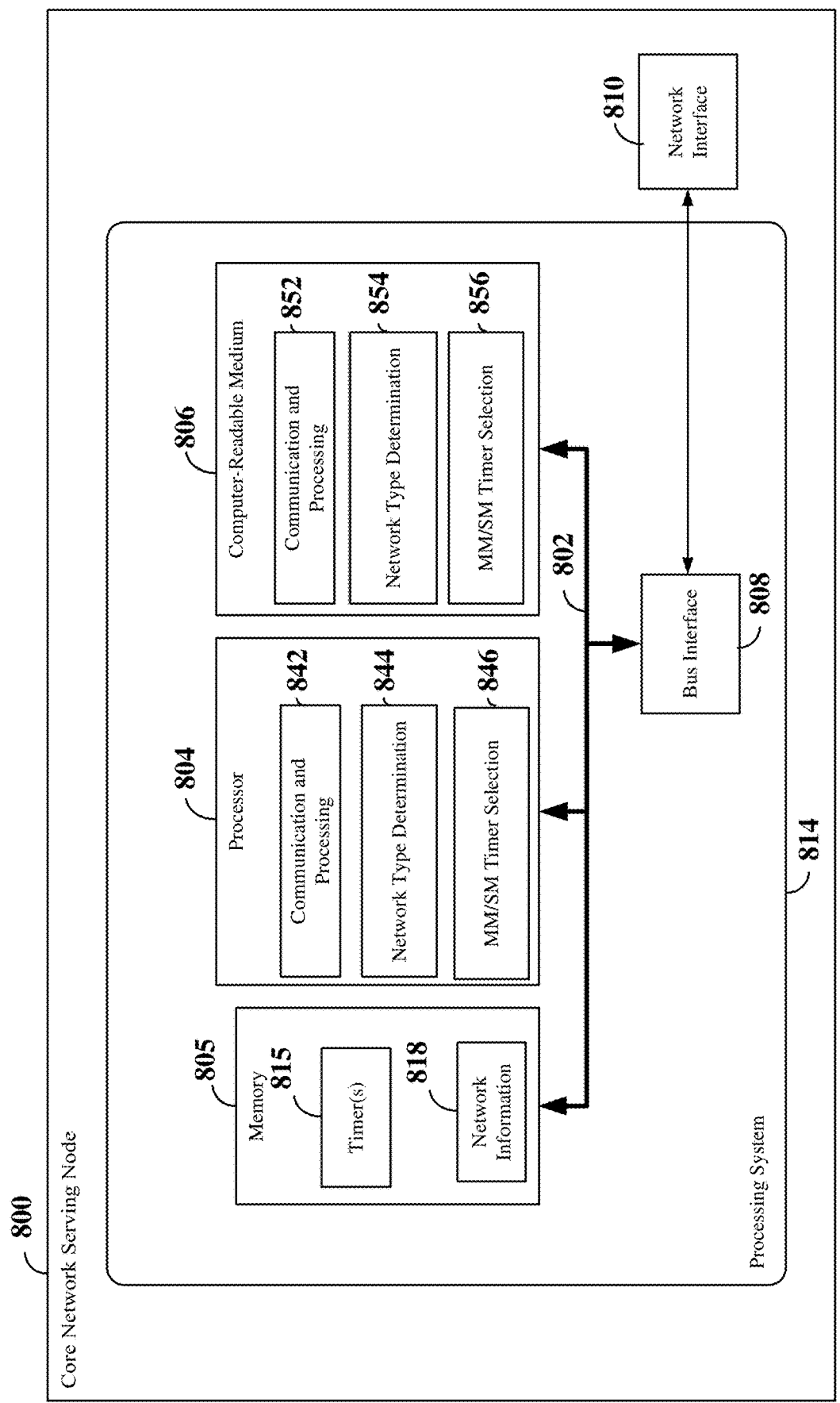
FIG. 8 is a block diagram conceptually illustrating an example of a hardware implementation for a core network serving node.

FIG. 8 is a conceptual diagram illustrating an example of a hardware implementation for an exemplary core network serving node 800 employing a processing system 814. In accordance with various aspects of the disclosure, an element, or any portion of an element, or any combination of elements may be implemented with a processing system 814 that includes one or more processors 804. For example, the core network serving node 800 may be an AMF or SMF, as illustrated in FIGS. 2, 4, 5, and/or 6.

The processing system 814 may be substantially the same as the processing system 714 illustrated in FIG. 7, including a bus interface 808, a bus 802, memory 805, a processor 804, and a computer-readable medium 806. Furthermore, the core network serving node 800 may include a network interface 810 that provides a means for communicating with various other apparatus within the core network and with one or more radio access networks. The processor 804, as utilized in the core network serving node 800, may be used to implement any one or more of the processes described below.

In some aspects of the disclosure, the processor 804 may include communication and processing circuitry 842. The communication and processing circuitry 842 may include one or more hardware components that provide the physical structure that performs various processes related to communication (e.g., signal reception and/or signal transmission) as described herein. The communication and processing circuitry 842 may further include one or more hardware components that provide the physical structure that performs various processes related to signal processing (e.g., processing a received signal and/or processing a signal for transmission) as described herein.

In examples in which the core network serving node 800 is an AMF, the communication and processing circuitry 842 may be configured to receive and process a registration request including one or more UE capabilities from a UE (e.g., such as the wireless communication device 700 shown in FIG. 7) via the network interface 810. The registration request may be received from the UE via a base station within a RAN. For example, the UE capabilities may include a network type indication that indicates whether the UE is capable of supporting both the terrestrial network type and the non-terrestrial network type or whether the UE is only capable of supporting the non-terrestrial network type. The UE capabilities (e.g., network type indication) may further indicate a set of one or more satellite types within the non-terrestrial network type supported by the UE. For example, the UE capabilities may indicate whether the UE supports communication with LEO, MEO, and/or GEO satellites.

The communication and processing circuitry 842 within the AMF may further be configured to generate and transmit a timer selection instruction to the UE via the network interface 810. The timer selection instruction may instruct the UE to utilize either the regular duration or the extended duration for mobility management (MM) and session management (SM) timers implemented at the UE. In some examples, the timer selection instruction may include specific timer values (durations) for each of the UE MM/SM timers.

The communication and processing circuitry 842 within the AMF may further be configured to perform mobility management procedures with the UE. In addition, the communication and processing circuitry 842 within the SMF may further be configured to perform session management procedures with the UE via the AMF. The communication and processing circuitry 842 may further be configured to execute communication and processing software 851 included on the computer-readable medium 806 to implement one or more functions described herein.

In examples in which the core network serving node is an AMF, the processor 804 may also include network type (e.g., RAN type) determination circuitry 844. The network type determination circuitry 844 may be configured to determine the network type (e.g., terrestrial or non-terrestrial) of the RAN to which the UE is attached. In some examples, the network type determination circuitry 844 may determine the network type based on the gNB ID part of the Global RAN Node ID of the RAN to which the UE is attached. In other examples, the network type determination circuitry 844 may determine the RAN type based on an explicit indication of the RAN type from the UE in the registration request. In still other examples, the network type determination circuitry 844 may determine the RAN type using any suitable information or tools available.

The network type determination circuitry 844 may further be configured to generate and transmit via the communication and processing circuitry 842 and the interface 810 the determined network type to the SMF within the core network. The network type determination circuitry 844 may further be configured to execute network type determination software 854 included on the computer-readable medium 806 to implement one or more functions described herein.

The processor 804 may further include MM/SM timer selection circuitry 846. The MM/SM timer selection circuitry 846 may be configured to select a respective duration for each timer in a set of one or more timers 815 for performing mobility management or session management procedures with the UE. The timers 815 may be maintained, for example, in memory 805. In some examples, each timer within the set of one or more timers 815 may be initialized with either the regular duration or the extended duration (or the specific duration indicated by the timer selection instruction). In examples in which the core network serving node 800 is an AMF, the timers 815 include MM (mobility management) timers. In examples in which the core network serving node 800 is an SMF, the timers 815 include SM (session management) timers.

In examples in which the core network serving node 800 is an AMF, the MM/SM timer selection circuitry 846 may be configured to select a respective duration for each timer in the set of one or more timers 815 for communication with the UE based on at least one of the network type of the attached-to RAN, as determined by the network type determination circuitry 844, or network information 818 associated with a registration area containing the attached-to RAN. The network information 818 may be maintained, for example, in memory 805 and may include a network type indicator for each RAN within the registration area. The network type indicators may indicate whether each RAN is a terrestrial RAN or a non-terrestrial RAN.

In some examples, the MM/SM timer selection circuitry 846 may select the respective duration for each time in the set of one or more timers 815 based on the network type. In this example, the selected duration for the set of timers 815 may include the regular duration when the network type is the terrestrial network type and the extended duration when the network type is the non-terrestrial network type.

In some examples, the MM/SM timer selection circuitry 846 may select the respective duration for each timer in the set of one or more timers 815 based on the network information 818. In this example, the selected duration for the set of timers 815 may include the regular duration when the registration area includes a homogeneous set of terrestrial networks and the extended duration when the registration area includes at least one non-terrestrial network. The MM/SM timer selection circuitry 846 may further generate and transmit via the communication and processing circuitry 842 and interface 810 a timer selection instruction to the UE instructing the UE to utilize the regular duration or the extended duration for a corresponding set of MM/SM timers on the UE. In some examples, the timer selection instruction instructs the UE to utilize the same duration (regular or extended) as the duration selected by the MM/SM timer selection circuitry 846 for the MM timers. In some examples, the timer selection instruction may include a respective specific value (duration) for each of the MM/SM timers within the UE.

In examples in which the core network serving node is an SMF, the MM/SM timer selection circuitry 846 may be configured to select a respective duration for each time in a set of SM timers 815 for performing session management procedures with the UE via the AMF. For example, the MM/SM timer selection circuitry 846 may be configured to select the regular duration or extended duration for the set of one or more timers 815 based on the network type received from the AMF. The MM/SM timer selection circuitry 846 may further be configured to execute MM/SM timer selection software 856 included on the computer-readable medium 806 to implement one or more functions described herein.

Figure 9:
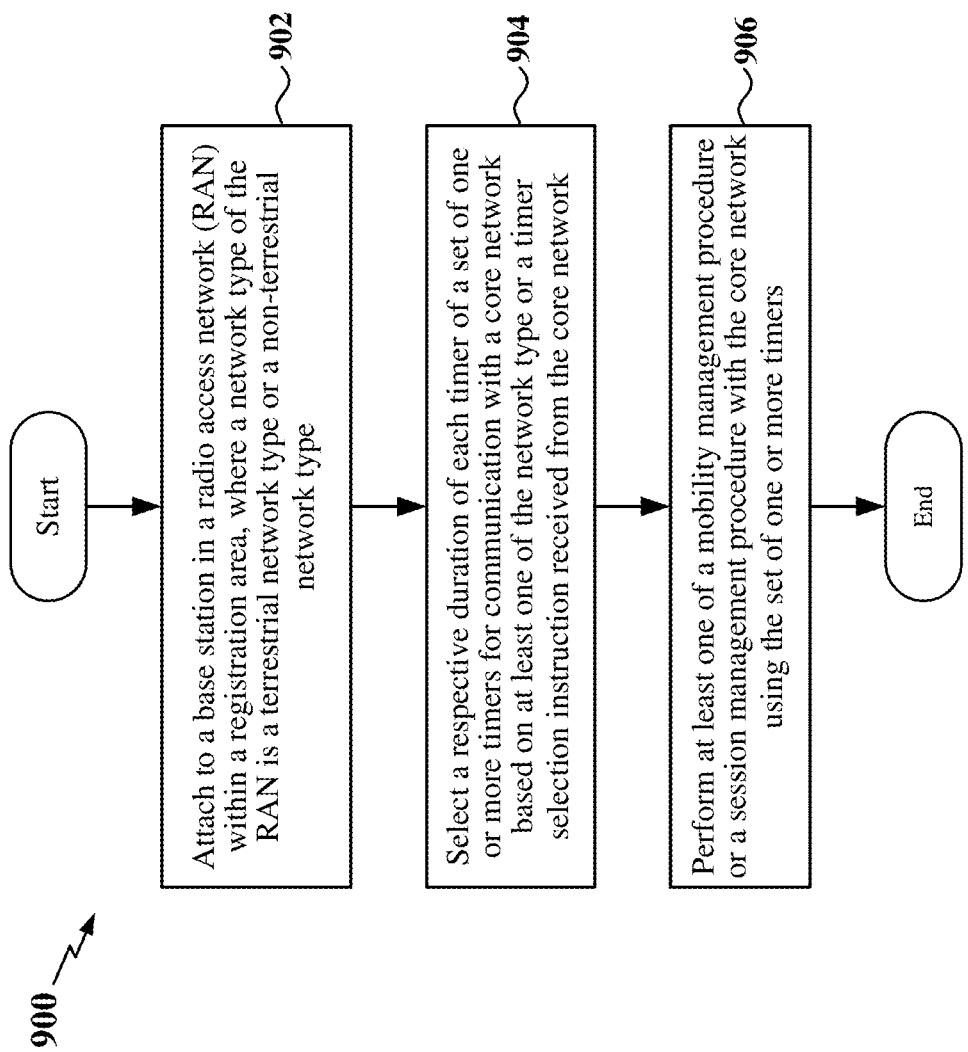
FIG. 9 is a flow chart illustrating an exemplary process for managing delay in a wireless communication system.

FIG. 9 is a flow chart illustrating an exemplary process 900 for managing delay in a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the wireless communication device 700 illustrated in FIG. 7. In some examples, the process 900 may be carried out by any suitable apparatus or means for carrying out the functions or algorithms described below.

At block 902, the wireless communication device (e.g., a UE) may attach to a base station in a radio access network (RAN) within a registration area. The network type of the RAN may be a terrestrial network type or a non-terrestrial network type. For example, the communication and processing circuitry 742 shown and described above in connection with FIG. 7 may provide a means to attach to the base station.

At block 904, the wireless communication device may select a respective duration of each timer of a set of one or more timers for communication with a core network based on at least one of the network type or a timer selection instruction received from the core network. Here, the selected duration for each of the timers may be a regular duration or an extended duration. In some examples, the wireless communication device may select the duration based on the network type. For example, the wireless communication device may select the regular duration when the network type is the terrestrial network type and the extended duration when the network type is the non-terrestrial network type. In other examples, the wireless communication device may select an initial duration of each timer of the set of one or more timers based on the network type or a default duration of each timer of the set of one or more timers and update the respective duration of each timer of set of one or more timers based on the timer selection instruction. For example, the MM/SM timer selection circuitry 746 shown and described above in connection with FIG. 7 may provide a means to select the respective duration of each timer of the set of one or more timers.

At block 906, the wireless communication device may perform at least one of a mobility management procedure or a session management procedure with the core network using the set of one or more timers. In some examples, each timer of the set of one or more timers is configured to establish a respective maximum duration of time for performing one of the mobility management procedures or the session management procedures. For example, the communication and processing circuitry 742 shown and described above in connection with FIG. 7 may provide a means to perform at least one mobility management procedure or session management procedure with the core network using the set of one or more timers.

Figure 10:
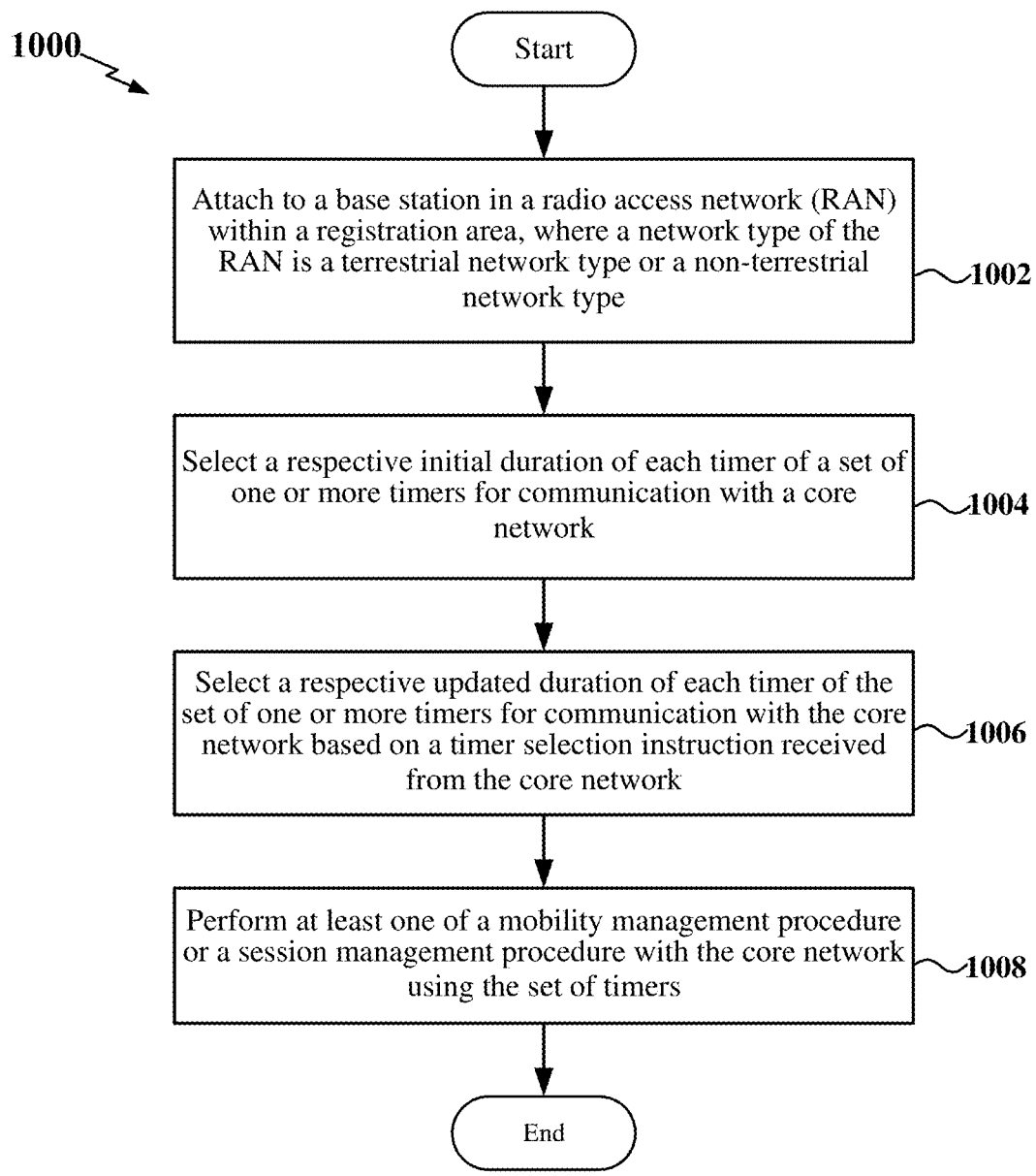
FIG. 10 is a flow chart illustrating another exemplary process for managing delay in a wireless communication system.

FIG. 10 is a flow chart illustrating another exemplary process 1000 for managing delay in a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the wireless communication device 700 illustrated in FIG. 7. In some examples, the process 1000 may be carried out by any suitable apparatus or means for carrying out the functions or algorithms described below.

At block 1002, the wireless communication device (e.g., a UE) may attach to a base station in a radio access network (RAN) within a registration area. The network type of the RAN may be a terrestrial network type or a non-terrestrial network type. For example, the communication and processing circuitry 742 shown and described above in connection with FIG. 7 may provide a means to attach to the base station.

At block 1004, the wireless communication device may select a respective initial duration of each timer of a set of one or more timers for communication with a core network. The initial duration may be a regular duration or an extended duration. In some examples, the wireless communication device may select the initial duration based on the network type. For example, the initial duration may be the regular duration when the network type is the terrestrial network type and the extended duration when the network type is the non-terrestrial network type. In other examples, the wireless communication device may select a respective default duration for each timer of the set of one or more timers irrespective of the network type. For example, the default duration may be the extended duration. For example, the MM/SM timer selection circuitry 746 shown and described above in connection with FIG. 7 may provide a means to select the respective initial duration of each timer of the set of one or more timers.

At block 1006, the wireless communication device may select a respective updated duration of each timer of the set of one or more timers for communication with the core network based on a timer selection instruction received from the core network. The updated duration may be the regular duration or the extended duration. In some examples, the updated duration may be the regular duration when the registration area includes a homogeneous set of terrestrial networks and the extended duration when the registration area includes at least one non-terrestrial network. For example, the MM/SM timer selection circuitry 746 shown and described above in connection with FIG. 7 may provide a means to select the respective updated duration of each timer of set of one or more timers.

At block 1008, the wireless communication device may perform at least one of a mobility management procedure or a session management procedure with the core network using the updated set of one or more timers. For example, the communication and processing circuitry 742 shown and described above in connection with FIG. 7 may provide a means to perform at least one mobility management procedure or session management procedure with the core network using the set of one or more timers.

Figure 11:
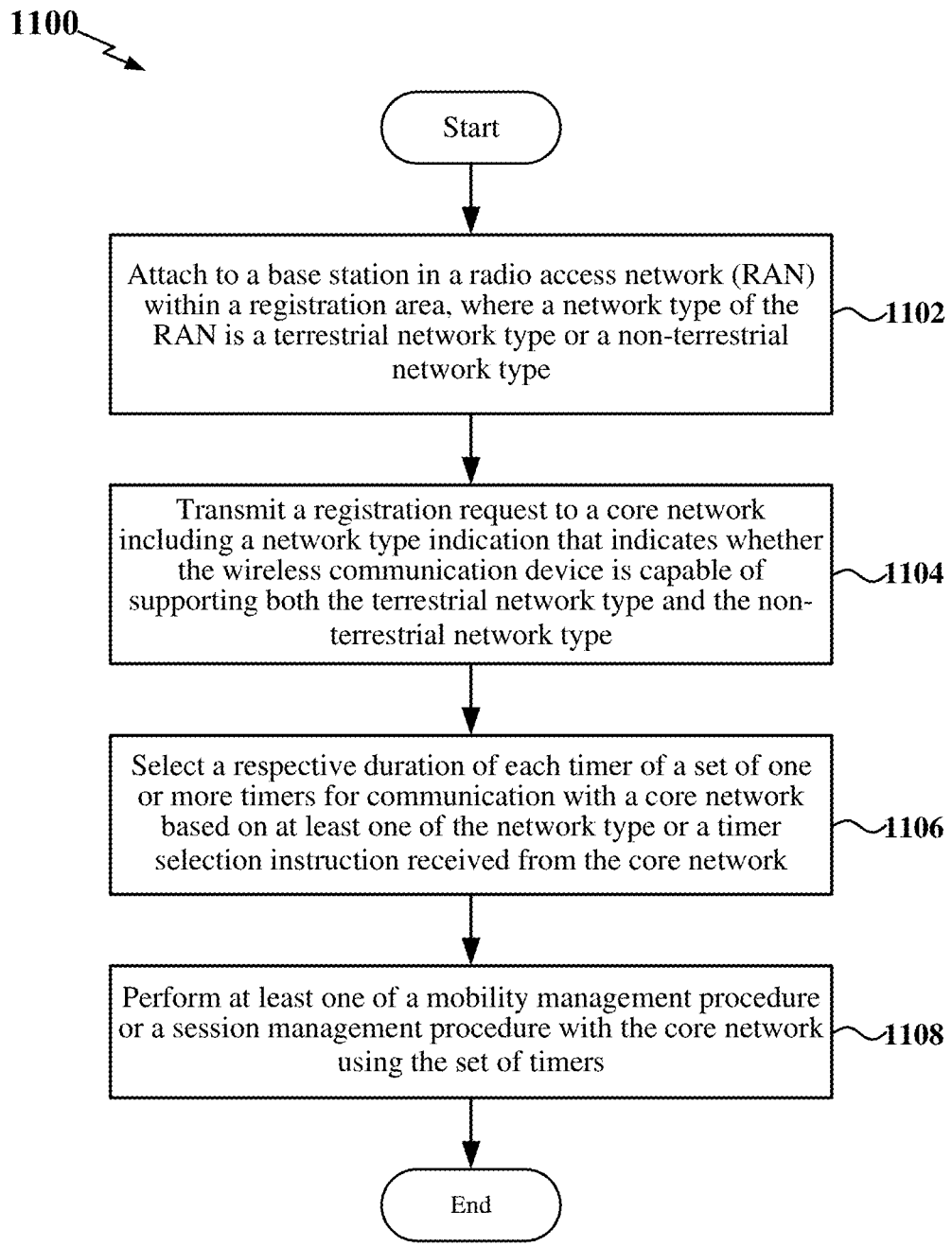
FIG. 11 is a flow chart illustrating another exemplary process for managing delay in a wireless communication system.

FIG. 11 is a flow chart illustrating another exemplary process 1100 for managing delay in a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the wireless communication device 700 illustrated in FIG. 7. In some examples, the process 1100 may be carried out by any suitable apparatus or means for carrying out the functions or algorithms described below.

At block 1102, the wireless communication device (e.g., a UE) may attach to a base station in a radio access network (RAN) within a registration area. The network type of the RAN may be a terrestrial network type or a non-terrestrial network type. For example, the communication and processing circuitry 742 shown and described above in connection with FIG. 7 may provide a means to attach to the base station.

At block 1104, the wireless communication device may transmit a registration request to a core network (e.g., via the base station) including a network type indication that indicates whether the wireless communication device is capable of supporting both the terrestrial network type and the non-terrestrial network type. In some examples, the network type indication further indicates a set of one or more satellite types within the non-terrestrial network type supported by the wireless communication device. For example, the communication and processing circuitry 742, together with the transceiver 710, shown and described above in connection with FIG. 7 may provide a means to transmit the registration request to the core network.

At block 1106, the wireless communication device may select a respective duration of each timer of a set of one or more timers for communication with a core network based on at least one of the network type or a timer selection instruction received from the core network. Here, the respective selected duration may be a regular duration or an extended duration. In some examples, the wireless communication device may select the respective duration of each timer of the set of one or more timers based on the network type. In other examples, the wireless communication device may select a respective initial duration of each timer of the set of one or more timers based on the network type or a respective default duration of each timer of the set of one or more timers and update the timer durations based on the timer selection instruction. For example, the MM/SM timer selection circuitry 746 shown and described above in connection with FIG. 7 may provide a means to select the respective duration of each timer of the set of one or more timers.

At block 1108, the wireless communication device may perform at least one of a mobility management procedure or a session management procedure with the core network using the set of one or more timers. For example, the communication and processing circuitry 742 shown and described above in connection with FIG. 7 may provide a means to perform at least one mobility management procedure or session management procedure with the core network using the set of one or more timers.

Figure 12:
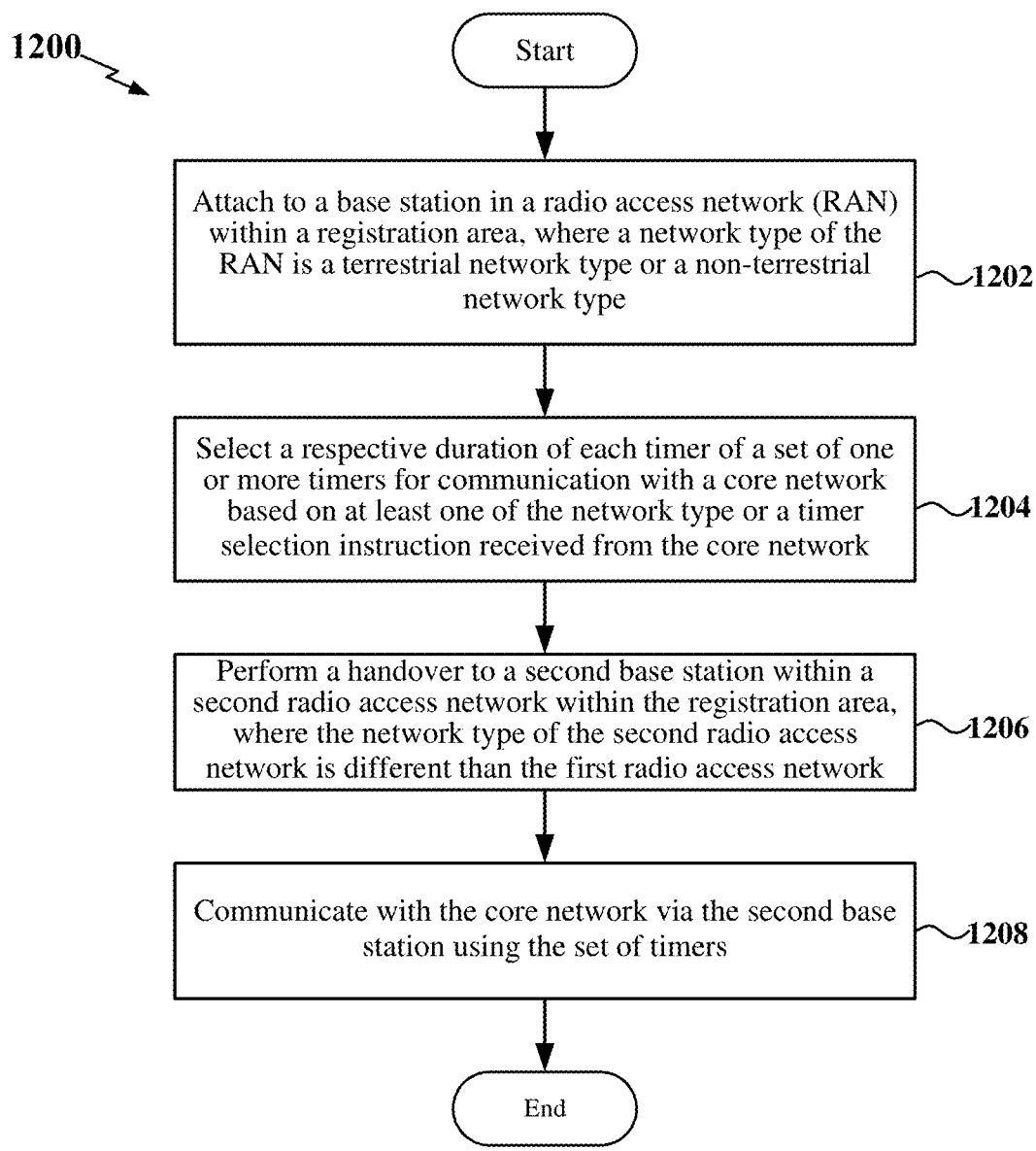
FIG. 12 is a flow chart illustrating another exemplary process for managing delay in a wireless communication system.

FIG. 12 is a flow chart illustrating another exemplary process 1200 for managing delay in a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the wireless communication device 700 illustrated in FIG. 7. In some examples, the process 1200 may be carried out by any suitable apparatus or means for carrying out the functions or algorithms described below.

At block 1202, the wireless communication device (e.g., a UE) may attach to a base station in a radio access network (RAN) within a registration area. The network type of the RAN may be a terrestrial network type or a non-terrestrial network type. For example, the communication and processing circuitry 742 shown and described above in connection with FIG. 7 may provide a means to attach to the base station.

At block 1204, the wireless communication device may select a respective duration of each timer of a set of one or more timers for communication with a core network based on at least one of the network type or a timer selection instruction received from the core network. Here, the respective duration may be a regular duration or an extended duration. In some examples, the wireless communication device may select the respective duration of each timer of the set of one or more timers based on the network type. In other examples, the wireless communication device may select a respective initial duration of each timer of the set of one or more timers based on the network type or a respective default duration of each timer of the set of one or more timers and update the timer durations based on the timer selection instruction. For example, the MM/SM timer selection circuitry 746 shown and described above in connection with FIG. 7 may provide a means to select the respective duration of each timer of the set of one or more timers.

At block 1206, the wireless communication device may perform a handover to a second base station within a second radio access network within the registration area. Here, the network type of the second radio access network is different than the first radio access network. For example, the first RAN may be a terrestrial RAN and the second RAN may be a non-terrestrial RAN. For example, the handover management circuitry 748 shown and described above in connection with FIG. 7 may provide a means to perform the handover.

At block 1208, the wireless communication device may communicate with the core network via the second base station using the set of one or more timers. Thus, the wireless communication device may maintain the same respective duration of each timer of the set of one or more timers utilized in the first RAN for communication with the core network via the second RAN. For example, the handover management circuitry 748, together with the MM/SM timer selection circuitry 746, communication and processing circuitry 742 and transceiver 710, shown and described above in connection with FIG. 7 may provide a means to communicate with the core network via the second base station using the set of one or more timers.

In one configuration, the wireless communication device 700 (e.g., a UE) includes means for managing delay in a wireless communication system as described in the present disclosure. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1-7, and utilizing, for example, the processes and/or algorithms described herein in relation to FIGS. 9-12.

Figure 13:
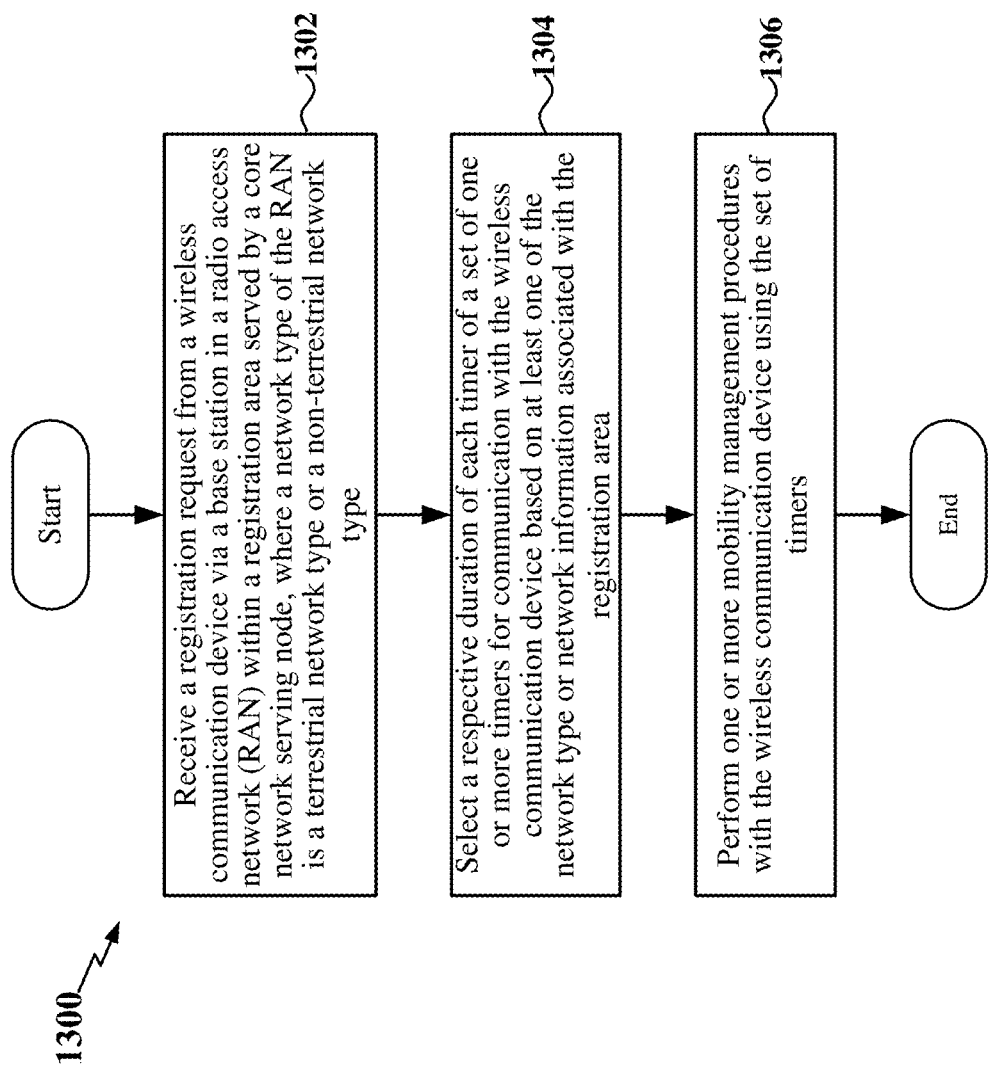
FIG. 13 is a flow chart illustrating another exemplary process for managing delay in a wireless communication system.

FIG. 13 is a flow chart illustrating another exemplary process 1300 for managing delay in a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the core network serving node 800 illustrated in FIG. 8. In some examples, the process 1300 may be carried out by any suitable apparatus or means for carrying out the functions or algorithms described below.

At block 1302, the core network serving node may receive a registration request from a wireless communication device via a base station in a radio access network (RAN) within a registration area served by a core network serving node. Here, a network type of the RAN is a terrestrial network type or a non-terrestrial network type. In some examples, the registration request may include one or more UE capabilities. For example, the UE capabilities may include a network type indication that indicates whether the wireless communication device is capable of supporting both terrestrial and non-terrestrial network types. In some examples, the network type indication may further indicate a set of one or more satellite types within the non-terrestrial network type supported by the wireless communication device. For example, the communication and processing circuitry 842 shown and described above in connection with FIG. 8 may provide a means to receive the registration request.

At block 1304, the core network serving node may select a respective duration of each timer of a set of one or more timers for communication with the wireless communication device based on at least one of the network type or network information associated with a registration area containing the RAN serving the wireless communication device. Here, the respective duration may be a regular duration or an extended duration. In some examples, the core network serving node may select the respective duration of each timer of the set of one or more timers based on the network type. The core network serving node may further select the respective duration of each timer of the set of one or more timers based on the network type indication of the wireless communication device included in the registration request. In other examples, the core network serving node may select the respective duration of each timer of the set of one or more timers based on the network information indicating whether the registration area includes a homogeneous set of terrestrial networks or at least one non-terrestrial network. For example, the core network serving node may select the regular duration when the registration area contains only terrestrial networks and may further select the extended duration when the registration area contains at least one non-terrestrial network. In this example, the core network serving node may further transmit a timer selection instruction to the wireless communication device instructing the wireless communication device to utilize the same selected duration (regular or extended) for a corresponding set of one or more timers on the wireless communication device. For example, the MM/SM timer selection circuitry 846 shown and described above in connection with FIG. 8 may provide a means to select the respective duration of each timer of the set of one or more timers.

At block 1306, the core network serving node may perform one or more mobility management procedures with the wireless communication device using the set of one or more timers. For example, each timer of the set of one or more timers may be configured to establish a respective maximum duration of time for performing one of the one or more mobility management procedures. In some examples, the core network serving node may further communicate with the wireless communication device using the set of one or more timers upon the wireless communication device performing a handover to a second base station within a second radio access network within the registration area. Here, the network type of the second radio access network may be different than the first radio access network. For example, the communication and processing circuitry 842 shown and described above in connection with FIG. 8 may provide a means to perform the mobility management procedures with the wireless communication device using the set of one or more timers.

Figure 14:
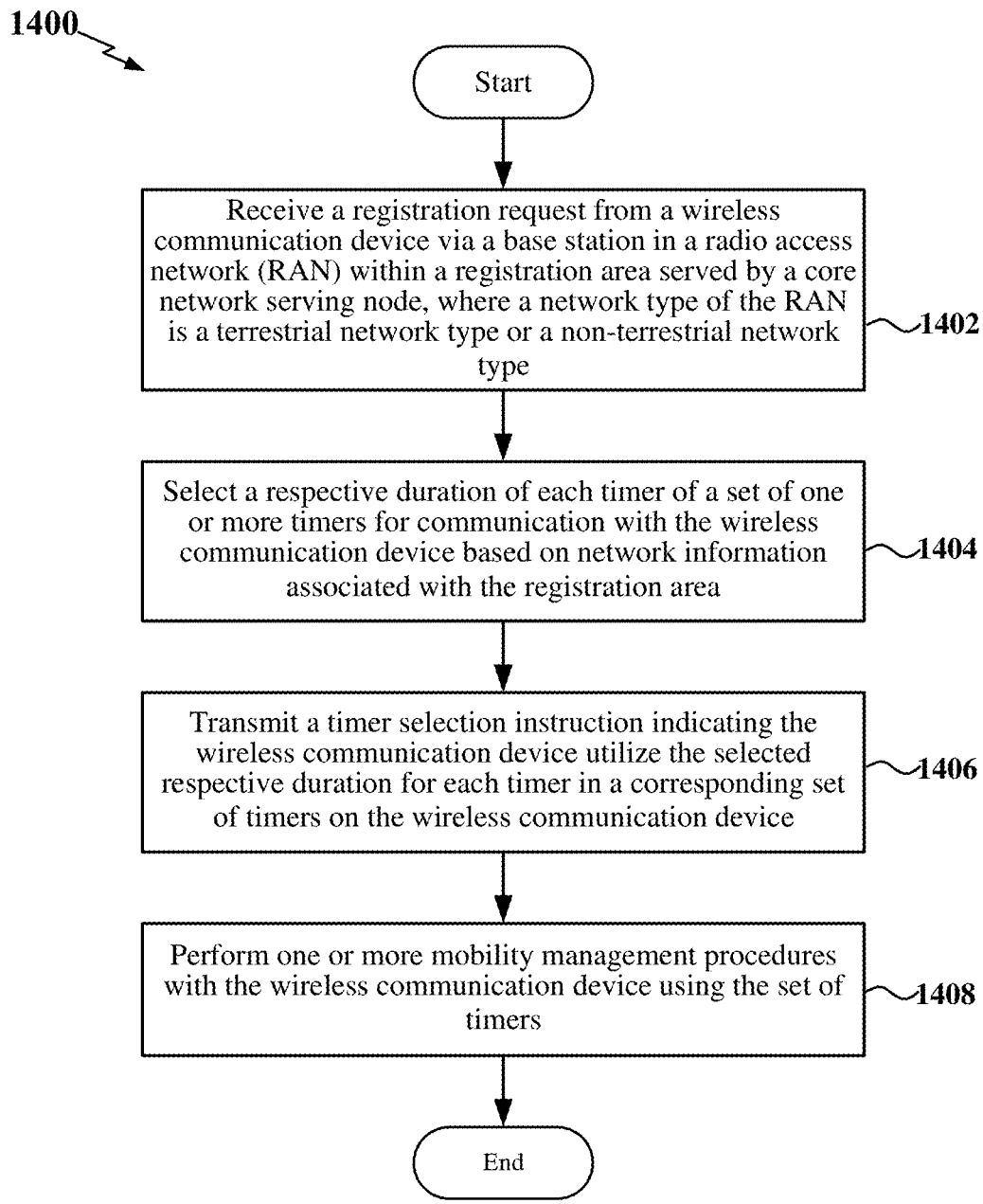
FIG. 14 is a flow chart illustrating another exemplary process for managing delay in a wireless communication system.

FIG. 14 is a flow chart illustrating another exemplary process 1400 for managing delay in a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the core network serving node 800 illustrated in FIG. 8. In some examples, the process 1400 may be carried out by any suitable apparatus or means for carrying out the functions or algorithm described below.

At block 1402, the core network serving node may receive a registration request from a wireless communication device via a base station in a radio access network (RAN) within a registration area served by a core network serving node. Here, a network type of the RAN is a terrestrial network type or a non-terrestrial network type. In some examples, the registration request may include one or more UE capabilities. For example, the UE capabilities may include a network type indication that indicates whether the wireless communication device is capable of supporting both terrestrial and non-terrestrial network types. For example, the communication and processing circuitry 842 shown and described above in connection with FIG. 8 may provide a means to receive the registration request.

At block 1404, the core network serving node may select a respective duration of each timer of a set of one or more timers for communication with the wireless communication device based on network information associated with a registration area containing the RAN serving the wireless communication device. Here, the respective duration may be a regular duration or an extended duration. In some examples, the core network serving node may select the respective duration of each timer of the set of one or more timers based on the network information indicating whether the registration area includes a homogeneous set of terrestrial networks or at least one non-terrestrial network. For example, the core network serving node may select the regular duration when the registration area contains only terrestrial networks and may further select the extended duration when the registration area contains at least one non-terrestrial network. For example, the MM/SM timer selection circuitry 846 shown and described above in connection with FIG. 8 may provide a means to select the respective duration of each timer of the set of one or more timers.

At block 1406, the core network serving node may transmit a timer selection instruction to the wireless communication device indicating the wireless communication device utilize the regular duration or the extended duration for a corresponding set of one or more timers on the wireless communication device. In some examples, the timer selection instruction may further indicate a respective value for each timer of the corresponding set of one or more timers. For example, the MM/SM timer selection circuitry 846, together with the communication and processing circuitry 842 and network interface 810, shown and described above in connection with FIG. 8 may provide a means to transmit the timer selection instruction.

At block 1408, the core network serving node may perform one or more mobility management procedures with the wireless communication device using the set of one or more timers. For example, the communication and processing circuitry 842 shown and described above in connection with FIG. 8 may perform the mobility management procedures with the wireless communication device using the set of one or more timers.

Figure 15:
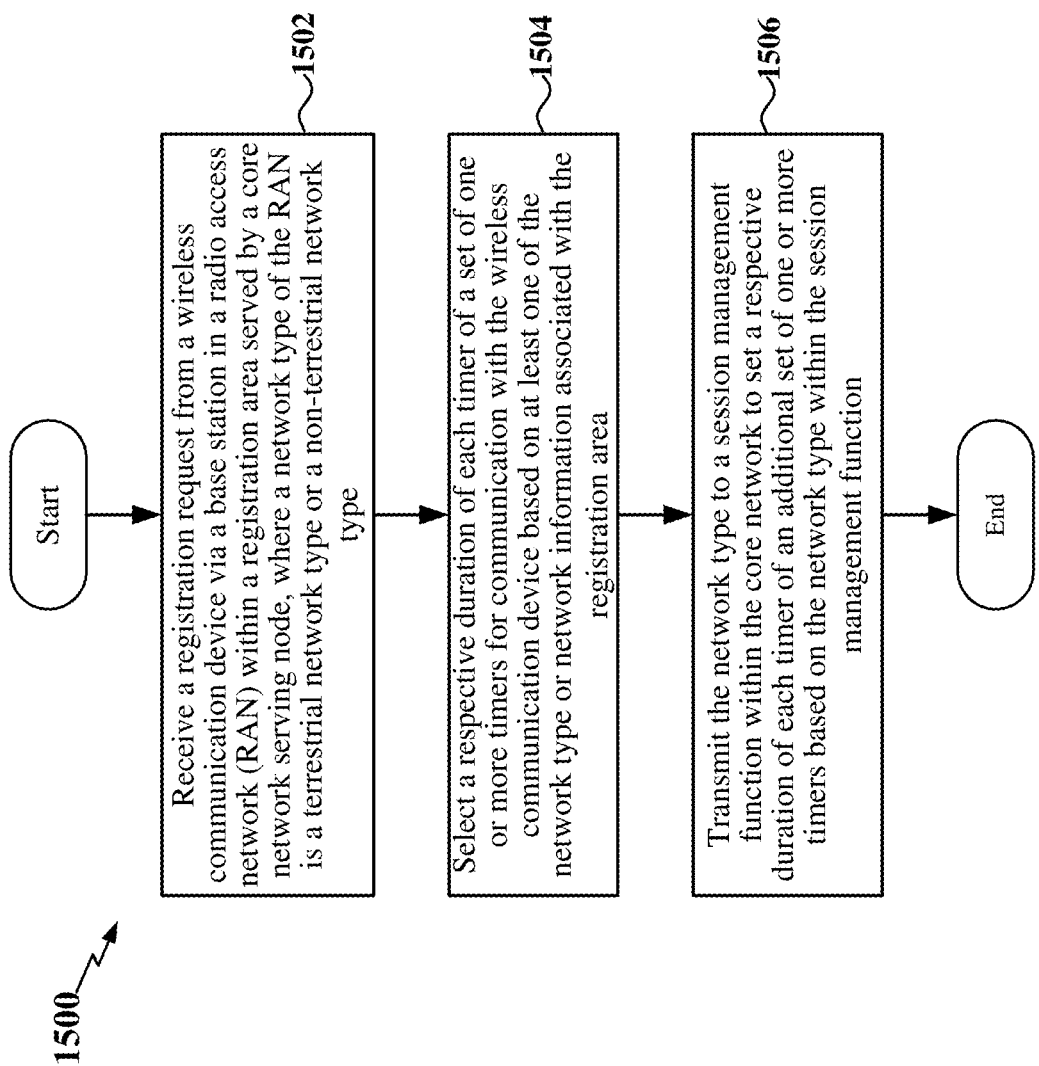
FIG. 15 is a flow chart illustrating another exemplary process for managing delay in a wireless communication system.

FIG. 15 is a flow chart illustrating another exemplary process 1500 for managing delay in a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the core network serving node 800 illustrated in FIG. 8. In some examples, the process 1500 may be carried out by any suitable apparatus or means for carrying out the functions or algorithm described below.

At block 1502, the core network serving node may receive a registration request from a wireless communication device via a base station in a radio access network (RAN) within a registration area served by a core network serving node. Here, a network type of the RAN is a terrestrial network type or a non-terrestrial network type. In some examples, the registration request may include one or more UE capabilities. For example, the UE capabilities may include a network type indication that indicates whether the wireless communication device is capable of supporting both terrestrial and non-terrestrial network types. For example, the communication and processing circuitry 842 shown and described above in connection with FIG. 8 may provide a means to receive the registration request.

At block 1504, the core network serving node may select a respective duration of each timer of a set of one or more timers for communication with the wireless communication device based on at least one of the network type or network information associated with a registration area containing the RAN serving the wireless communication device. Here, the respective duration may be a regular duration or an extended duration. In some examples, the core network serving node may select the respective duration of each timer of the set of one or more timers based on the network type. In other examples, the core network serving node may select the respective duration of each timer of the set of one or more timers based on the network information indicating whether the registration area includes a homogeneous set of terrestrial networks or at least one non-terrestrial network. For example, the core network serving node may select the regular duration when the registration area contains only terrestrial networks and may further select the extended duration when the registration area contains at least one non-terrestrial network. In this example, the core network serving node may further transmit a timer selection instruction to the wireless communication device instructing the wireless communication device to utilize the same selected duration (regular or extended) for a corresponding set of one or more timers on the wireless communication device. For example, the MM/SM timer selection circuitry 846 shown and described above in connection with FIG. 8 may provide a means to select the set of one or more timers.

At block 1506, the core network serving node may be an access management function that may transmit the network type to a session management function within the core network to set an additional respective duration of each timer of an additional set of one or more timers based on the network type within the session management function. For example, the communication and processing circuitry 842 and network interface 810 shown and described above in connection with FIG. 8 may provide a means transmit the network type to the session management function.

In one configuration, the core network serving node 800 (e.g., AMF) includes means for managing delay in a wireless communication system as described in the present disclosure. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-6 and/or 8, and utilizing, for example, the processes and/or algorithms described herein in relation to FIGS. 13-15.

The following provides an overview of examples of the present disclosure.

Example 1: A method for managing delays by a wireless communication device, the method comprising: attaching to a first base station in a first radio access network within a registration area, the first radio access network comprising a network type, wherein the network type comprises a terrestrial network type or a non-terrestrial network type; selecting a respective duration of each timer of a set of one or more timers for communication with a core network via the first base station based on at least one of the network type or a timer selection instruction received from the core network; and performing at least one of a mobility management procedure or a session management procedure with the core network using the set of one or more timers.

Example 2: The method of example 1, wherein the selecting the respective duration of each timer of the set of one or more timers further comprises: selecting the respective duration of each timer of the set of one or more timers based on the network type, wherein the respective duration comprises a regular duration when the network type comprises the terrestrial network type and an extended duration when the network type comprises the non-terrestrial network type.

Example 3: The method of example 1 or 2, wherein the selecting the respective duration of each timer of the set of one or more timers further comprises: selecting a respective initial duration of each timer of the set of one or more timers, wherein the respective initial duration comprises a regular duration or an extended duration; and selecting a respective updated duration of each timer of the set of one or more timers based on the timer selection instruction, wherein the respective updated duration comprises the regular duration when the registration area comprises a homogeneous set of terrestrial networks and the extended duration when the registration area comprises at least one non-terrestrial network.

Example 4: The method of any of examples 1 through 3, wherein the selecting the respective initial duration of each timer of the set of one or more timers further comprises: selecting the respective initial duration of each timer of the set of one or more timers based on the network type, wherein the respective initial duration comprises the regular duration when the network type comprises the terrestrial network type and the extended duration when the network type comprises the non-terrestrial network type.

Example 5: The method of any of examples 1 through 3, wherein the selecting the respective initial duration of each timer of the set of one or more timers further comprises: selecting a respective default duration of each timer of the set of one or more timers irrespective of the network type.

Example 6: The method of example 5, wherein the respective default duration comprises the extended duration.

Example 7: The method of any of examples 1 through 6, further comprising: transmitting a registration request to the core network via the base station, wherein the registration request comprises a network type indication that indicates whether the wireless communication device is capable of supporting both the terrestrial network type and the non-terrestrial network type.

Example 8: The method of example 7, wherein the network type indication further indicates a set of one or more satellite types within the non-terrestrial network type supported by the wireless communication device.

Example 9: The method of any of examples 1 through 8, further comprising: performing a handover to a second base station within a second radio access network within the registration area, wherein the network type of the second radio access network is different than the first radio access network; and communicating with the core network via the second base station using the set of timers.

Example 10: The method of any of examples 1 through 9, wherein each timer of the set of one or more timers is configured to establish a respective maximum duration of time for performing one of the mobility management procedures or the session management procedures.

Example 11: A wireless communication device in a wireless communication network, the wireless communication device comprising a transceiver, a memory, and a processor communicatively coupled to the transceiver and the memory, the processor and memory configured to perform a method of any one of examples 1 through 10.

Example 12: A method for managing delays by a core network serving node in a core network, the method comprising: receiving a registration request from a wireless communication device via a first base station in a first radio access network within a registration area served by the core network serving node, the first radio access network comprising a network type, wherein the network type comprises a terrestrial network type or a non-terrestrial network type; selecting a respective duration of each timer of a set of one or more timers for communication with the wireless communication device via the first base station based on at least one of the network type of the first radio access network or network information associated with the registration area; and performing one or more mobility management procedures with the wireless communication device using the set of one or more timers.

Example 13: The method of example 12, wherein the selecting the respective duration of each timer of the set of one or more timers further comprises: selecting the respective duration of each timer of the set of one or more timers based on the network type, wherein the respective duration comprises a regular duration when the network type comprises the terrestrial network type and an extended duration when the network type comprises the non-terrestrial network type.

Example 14: The method of example 12 or 13, wherein the selecting the respective duration of each timer of the set of one or more timers further comprises: selecting the respective duration of each timer of the set of one or more timers based on the network information associated with the registration area, wherein the respective duration comprises a regular duration when the registration area comprises a homogeneous set of terrestrial networks and an extended duration when the registration area comprises at least one non-terrestrial network.

Example 15: The method of any of examples 12 through 14, further comprising: transmitting a timer selection instruction indicating the wireless communication device utilize the regular duration or the extended duration for a corresponding set of one or more timers on the wireless communication device.

Example 16: The method of example 15, wherein the timer selection instruction further indicates a respective value for each timer of the corresponding set of one or more timers.

Example 17: The method of any of examples 12 through 16, wherein the core network serving node comprises an access management function and further comprising: transmitting the network type to a session management function within the core network to set an additional respective duration of each timer of an additional set of one or more timers based on the network type within the session management function, wherein the respective additional duration comprises a regular duration when the network type comprises the terrestrial network type and an extended duration when the network type comprises the non-terrestrial network type.

Example 18: The method of any of examples 12 through 17, wherein the registration request comprises a network type indication that indicates whether the wireless communication device is capable of supporting both the terrestrial network type and the non-terrestrial network type.

Example 19: The method of example 18, wherein the network type indication further indicates a set of one or more satellite types within the non-terrestrial network type supported by the wireless communication device.

Example 20: The method of example 18 or 19, wherein the selecting the set of timers further comprises: selecting the respective duration of each timer of the set of one or more timers further based on the network type indication.

Example 21: The method of any of examples 12 through 20, further comprising: communicating with the wireless communication device using the set of one or more timers upon the wireless communication device performing a handover to a second base station within a second radio access network within the registration area, wherein the network type of the second radio access network is different than the first radio access network.

Example 22: The method of any of examples 12 through 21, wherein each timer of the set of one or more timers is configured to establish a respective maximum duration of time for performing one of the one or more mobility management procedures.

Example 23: A core network serving node in a core network comprising a network interface, a memory, and a processor communicatively coupled to the transceiver and the memory, the processor and memory configured to perform a method of any one of examples 12 through 22.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (WI-FI), IEEE 802.16 (WIMAX), IEEE 802.20, Ultra-Wideband (UWB), BLUETOOTH, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for managing delays by a wireless communication device, the method comprising:
    attaching to a first base station in a first radio access network within a registration area, the first radio access network comprising a network type, wherein the network type comprises a terrestrial network type or a non-terrestrial network type;
    transmitting a registration request to a core network via the first base station, wherein the registration request comprises a network type indication that indicates whether the wireless communication device is capable of supporting both the terrestrial network type and the non-terrestrial network type;
    selecting a respective duration of each timer of a set of one or more timers for communication with the core network via the first base station based on at least one of the network type or a timer selection instruction received from the core network; and
    performing at least one of a mobility management procedure or a session management procedure with the core network using the set of one or more timers.

2. The method of claim 1, wherein the selecting the respective duration of each timer of the set of one or more timers further comprises:
    selecting the respective duration of each timer of the set of one or more timers based on the network type, wherein the respective duration comprises a regular duration when the network type comprises the terrestrial network type and an extended duration when the network type comprises the non-terrestrial network type.

3. The method of claim 1, wherein the selecting the respective duration of each timer of the set of one or more timers further comprises:
    selecting a respective initial duration of each timer of the set of one or more timers, wherein the respective initial duration comprises a regular duration or an extended duration; and selecting a respective updated duration of each timer of the set of one or more timers based on the timer selection instruction, wherein the respective updated duration comprises the regular duration when the registration area comprises a homogeneous set of terrestrial networks and the extended duration when the registration area comprises at least one non-terrestrial network.

4. The method of claim 3, wherein the selecting the respective initial duration of each timer of the set of one or more timers further comprises:
selecting the respective initial duration of each timer of the set of one or more timers based on the network type, wherein the respective initial duration comprises the regular duration when the network type comprises the terrestrial network type and the extended duration when the network type comprises the non-terrestrial network type.

5. The method of claim 3, wherein the selecting the respective initial duration of each timer of the set of one or more timers further comprises:
selecting a respective default duration of each timer of the set of one or more timers irrespective of the network type.

6. The method of claim 5, wherein the respective default duration comprises the extended duration.

7. The method of claim 1, wherein the network type indication further indicates a set of one or more satellite types within the non-terrestrial network type supported by the wireless communication device.

8. The method of claim 1, further comprising:
performing a handover to a second base station within a second radio access network within the registration area, wherein the network type of the second radio access network is different than the first radio access network; and
communicating with the core network via the second base station using the set of one or more timers.

9. The method of claim 1, wherein each timer of the set of one or more timers is configured to establish a respective maximum duration of time for performing one of the mobility management procedure or the session management procedure.

10. A wireless communication device in a wireless communication network, comprising:
a transceiver;
a memory; and
a processor coupled to the transceiver and the memory, wherein the processor and the memory are configured to:
attach to a base station within a first radio access network within a registration area via the transceiver, the first radio access network comprising a network type, wherein the network type comprises a terrestrial network type or a non-terrestrial network type;
transmit a registration request to a core network via the first base station, wherein the registration request comprises a network type indication that indicates whether the wireless communication device is capable of supporting both the terrestrial network type and the non-terrestrial network type;
select a respective duration of each timer of a set of one or more timers for communication with the core network via the first radio access network based on at least one of the network type or a timer selection instruction received from the core network; and
perform at least one of a mobility management procedure or a session management procedure with the core network using the set of one or more timers via the transceiver.

11. The wireless communication device of claim 10, wherein the processor and the memory are further configured to:
select a respective initial duration of each timer of the set of one or more timers, wherein the respective initial duration comprises a regular duration or an extended duration; and
select a respective updated duration of each timer of the set of one or more timers based on the timer selection instruction, wherein the respective updated duration comprises the regular duration when the registration area comprises a homogeneous set of terrestrial networks and the extended duration when the registration area comprises at least one non-terrestrial network.

12. The wireless communication device of claim 11, wherein the processor and the memory are further configured to:
select the respective initial duration of each timer of the set of one or more timers based on the network type, wherein the respective initial duration comprises the regular duration when the network type comprises the terrestrial network type and the extended duration when the network type comprises the non-terrestrial network type.

13. The wireless communication device of claim 11, wherein the processor and the memory are further configured to:
select a respective default duration of each timer of the set of one or more timers irrespective of the network type, wherein the respective default duration comprises the extended duration.

14. The wireless communication device of claim 10, wherein the processor and the memory are further configured to:
select the respective duration of each timer of the set of one or more timers based on the network type, wherein the respective duration comprises a regular duration when the network type comprises the terrestrial network type and an extended duration when the network type comprises the non-terrestrial network type.

15. The wireless communication device of claim 10, wherein the network type indication further indicates a set of one or more satellite types within the non-terrestrial network type supported by the wireless communication device.

16. The wireless communication device of claim 10, wherein the processor and the memory are further configured to:
perform a handover to a second base station within a second radio access network within the registration area, wherein the network type of the second radio access network is different than the first radio access network; and
communicate with the core network via the second base station using the set of one or more timers.

17. The wireless communication device of claim 10, wherein each timer of the set of one or more timers is configured to establish a respective maximum duration of time for performing one of the mobility management procedure or the session management procedure.

18. A wireless communication device, comprising:
means for attaching to a first base station in a first radio access network within a registration area, the first radio access network comprising a network type, wherein the network type comprises a terrestrial network type or a non-terrestrial network type;

means for transmitting a registration request to a core network via the first base station, wherein the registration request comprises a network type indication that indicates whether the wireless communication device is capable of supporting both the terrestrial network type and the non-terrestrial network type;

means for selecting a respective duration of each timer of a set of one or more timers for communication with the core network via the first base station based on at least one of the network type or a timer selection instruction received from the core network; and means for performing at least one of a mobility management procedure or a session management procedure with the core network using the set of one or more timers.

19. The wireless communication device of claim 18, wherein the means for selecting the respective duration of each timer of the set of one or more timers further comprises:

means for selecting the respective duration of each timer of the set of one or more timers based on the network type, wherein the respective duration comprises a regular duration when the network type comprises the terrestrial network type and an extended duration when the network type comprises the non-terrestrial network type.

20. The wireless communication device of claim 18, wherein the means for selecting the respective duration of each timer of the set of one or more timers further comprises:

means for selecting a respective initial duration of each timer of the set of one or more timers, wherein the respective initial duration comprises a regular duration or an extended duration; and means for selecting a respective updated duration of each timer of the set of one or more timers based on the timer selection instruction, wherein the respective updated duration comprises the regular duration when the registration area comprises a homogeneous set of terrestrial networks and the extended duration when the registration area comprises at least one non-terrestrial network.

21. The wireless communication device of claim 20, wherein the means for selecting the respective initial duration of each timer of the set of one or more timers further comprises:

means for selecting the respective initial duration of each timer of the set of one or more timers based on the network type, wherein the respective initial duration comprises the regular duration when the network type comprises the terrestrial network type and the extended duration when the network type comprises the non-terrestrial network type.

22. The wireless communication device of claim 20, wherein the means for selecting the respective initial duration of each timer of the set of one or more timers further comprises:

means for selecting a respective default duration of each timer of the set of one or more timers irrespective of the network type, wherein the respective default duration comprises the extended duration.

23. The wireless communication device of claim 18, wherein the network type indication further indicates a set of one or more satellite types within the non-terrestrial network type supported by the wireless communication device.

24. The wireless communication device of claim 18, further comprising:

means for performing a handover to a second base station within a second radio access network within the registration area, wherein the network type of the second radio access network is different than the first radio access network; and means for communicating with the core network via the second base station using the set of one or more timers.

25. The wireless communication device of claim 18, wherein each timer of the set of one or more timers is configured to establish a respective maximum duration of time for performing one of the mobility management procedure or the session management procedure.

26. A non-transitory computer-readable medium having stored therein instructions executable by one or more processors of a wireless communication device to:

attach to a base station within a first radio access network within a registration area via the transceiver, the first radio access network comprising a network type, wherein the network type comprises a terrestrial network type or a non-terrestrial network type;

transmit a registration request to a core network via the first base station, wherein the registration request comprises a network type indication that indicates whether the wireless communication device is capable of supporting both the terrestrial network type and the non-terrestrial network type;

select a respective duration of each timer of a set of one or more timers for communication with the core network via the first radio access network based on at least one of the network type or a timer selection instruction received from the core network; and perform at least one of a mobility management procedure or a session management procedure with the core network using the set of one or more timers via the transceiver.

27. The non-transitory computer-readable medium of claim 26, further comprising instructions executable by the one or more processors of the wireless communication device to:

select the respective duration of each timer of the set of one or more timers based on the network type, wherein the respective duration comprises a regular duration when the network type comprises the terrestrial network type and an extended duration when the network type comprises the non-terrestrial network type.

28. The non-transitory computer-readable medium of claim 26, further comprising instructions executable by the one or more processors of the wireless communication device to:

select a respective initial duration of each timer of the set of one or more timers, wherein the respective initial duration comprises a regular duration or an extended duration; and select a respective updated duration of each timer of the set of one or more timers based on the timer selection instruction, wherein the respective updated duration comprises the regular duration when the registration area comprises a homogeneous set of terrestrial networks and the extended duration when the registration area comprises at least one non-terrestrial network.

29. The non-transitory computer-readable medium of claim 26, further comprising instructions executable by the one or more processors of the wireless communication device to:

select a respective default duration of each timer of the set of one or more timers irrespective of the network type, wherein the respective default duration comprises the extended duration.

30. A method for managing delays by a wireless communication device, the method comprising:
attaching to a first base station in a first radio access network within a registration area, the first radio access network comprising a network type, wherein the network type comprises a terrestrial network type or a non-terrestrial network type;
selecting a respective duration of each timer of a set of one or more timers for communication with a core network via the first base station based on at least one of the network type or a timer selection instruction received from the core network;
performing at least one of a mobility management procedure or a session management procedure with the core network using the set of one or more timers;
performing a handover to a second base station within a second radio access network within the registration area, wherein the network type of the second radio access network is different than the first radio access network; and
communicating with the core network via the second base station using the set of one or more timers.

31. The method of claim 30, wherein the selecting the respective duration of each timer of the set of one or more timers further comprises:
selecting the respective duration of each timer of the set of one or more timers based on the network type, wherein the respective duration comprises a regular duration when the network type comprises the terrestrial network type and an extended duration when the network type comprises the non-terrestrial network type.

32. The method of claim 30, wherein the selecting the respective duration of each timer of the set of one or more timers further comprises:
selecting a respective initial duration of each timer of the set of one or more timers, wherein the respective initial duration comprises a regular duration or an extended duration; and
selecting a respective updated duration of each timer of the set of one or more timers based on the timer selection instruction, wherein the respective updated duration comprises the regular duration when the registration area comprises a homogeneous set of terrestrial networks and the extended duration when the registration area comprises at least one non-terrestrial network.

33. The method of claim 32, wherein the selecting the respective initial duration of each timer of the set of one or more timers further comprises:
selecting the respective initial duration of each timer of the set of one or more timers based on the network type, wherein the respective initial duration comprises the regular duration when the network type comprises the terrestrial network type and the extended duration when the network type comprises the non-terrestrial network type.

34. The method of claim 32, wherein the selecting the respective initial duration of each timer of the set of one or more timers further comprises:
selecting a respective default duration of each timer of the set of one or more timers irrespective of the network type, wherein the respective default duration comprises the extended duration.

35. The method of claim 30, further comprising:
transmitting a registration request to a core network via the first base station, wherein the registration request comprises a network type indication that indicates whether the wireless communication device is capable of supporting both the terrestrial network type and the non-terrestrial network type.

36. A wireless communication device in a wireless communication network, comprising:
a transceiver;
a memory; and
a processor coupled to the transceiver and the memory, wherein the processor and the memory are configured to:
attach to a first base station in a first radio access network within a registration area, the first radio access network comprising a network type, wherein the network type comprises a terrestrial network type or a non-terrestrial network type;
select a respective duration of each timer of a set of one or more timers for communication with a core network via the first base station based on at least one of the network type or a timer selection instruction received from the core network;
perform at least one of a mobility management procedure or a session management procedure with the core network using the set of one or more timers
perform a handover to a second base station within a second radio access network within the registration area, wherein the network type of the second radio access network is different than the first radio access network; and
communicate with the core network via the second base station using the set of one or more timers.

37. The wireless communication device of claim 36, wherein the processor and the memory are further configured to:
select the respective duration of each timer of the set of one or more timers based on the network type, wherein the respective duration comprises a regular duration when the network type comprises the terrestrial network type and an extended duration when the network type comprises the non-terrestrial network type.

38. The wireless communication device of claim 36, wherein the processor and the memory are further configured to:
select a respective initial duration of each timer of the set of one or more timers, wherein the respective initial duration comprises a regular duration or an extended duration; and
select a respective updated duration of each timer of the set of one or more timers based on the timer selection instruction, wherein the respective updated duration comprises the regular duration when the registration area comprises a homogeneous set of terrestrial networks and the extended duration when the registration area comprises at least one non-terrestrial network.

39. The wireless communication device of claim 38, wherein the processor and the memory are further configured to:
select the respective initial duration of each timer of the set of one or more timers based on the network type, wherein the respective initial duration comprises the regular duration when the network type comprises the terrestrial network type and the extended duration when the network type comprises the non-terrestrial network type.

40. The wireless communication device of claim 38, wherein the processor and the memory are further configured to:
select a respective default duration of each timer of the set of one or more timers irrespective of the network type, wherein the respective default duration comprises the extended duration.

41. The wireless communication device of claim 36, further comprising:
transmitting a registration request to a core network via the first base station, wherein the registration request comprises a network type indication that indicates whether the wireless communication device is capable of supporting both the terrestrial network type and the non-terrestrial network type.

42. A wireless communication device, comprising:
means for attaching to a first base station in a first radio access network within a registration area, the first radio access network comprising a network type, wherein the network type comprises a terrestrial network type or a non-terrestrial network type;
means for selecting a respective duration of each timer of a set of one or more timers for communication with a core network via the first base station based on at least one of the network type or a timer selection instruction received from the core network;
means for performing at least one of a mobility management procedure or a session management procedure with the core network using the set of one or more timers;
means for performing a handover to a second base station within a second radio access network within the registration area, wherein the network type of the second radio access network is different than the first radio access network; and
means for communicating with the core network via the second base station using the set of one or more timers.

43. The wireless communication device of claim 42, wherein the means for selecting the respective duration of each timer of the set of one or more timers further comprises:
means for selecting the respective duration of each timer of the set of one or more timers based on the network type, wherein the respective duration comprises a regular duration when the network type comprises the terrestrial network type and an extended duration when the network type comprises the non-terrestrial network type.

44. The wireless communication device of claim 42, wherein the means for selecting the respective duration of each timer of the set of one or more timers further comprises:
means for selecting a respective initial duration of each timer of the set of one or more timers, wherein the respective initial duration comprises a regular duration or an extended duration; and
means for selecting a respective updated duration of each timer of the set of one or more timers based on the timer selection instruction, wherein the respective updated duration comprises the regular duration when the registration area comprises a homogeneous set of terrestrial networks and the extended duration when the registration area comprises at least one non-terrestrial network.

45. The wireless communication device of claim 44, wherein the means for selecting the respective initial duration of each timer of the set of one or more timers further comprises:
means for selecting the respective initial duration of each timer of the set of one or more timers based on the network type, wherein the respective initial duration comprises the regular duration when the network type comprises the terrestrial network type and the extended duration when the network type comprises the non-terrestrial network type.

46. The wireless communication device of claim 44, wherein the means for selecting the respective initial duration of each timer of the set of one or more timers further comprises:
means for selecting a respective default duration of each timer of the set of one or more timers irrespective of the network type, wherein the respective default duration comprises the extended duration.

47. The wireless communication device of claim 42, further comprising:
means for transmitting a registration request to a core network via the first base station, wherein the registration request comprises a network type indication that indicates whether the wireless communication device is capable of supporting both the terrestrial network type and the non-terrestrial network type.

* * * * *